(12) United States Patent
Petrov et al.

(10) Patent No.: US 11,485,490 B2
(45) Date of Patent: Nov. 1, 2022

(54) SYSTEM AND METHODS FOR PROVIDING VERTICAL TAKE OFF AND LANDING AND FORWARD FLIGHT IN A SMALL PERSONAL AIRCRAFT

(71) Applicant: Armada Aeronautics, Inc., Mountain View, CA (US)

(72) Inventors: Oleg Petrov, Sunnyvale, CA (US); Konstantin Kisly, Palo Alto, CA (US); Yevgeniy Dukhovny, Mountain View, CA (US); Pavel Markin, San Jose, CA (US)

(73) Assignee: Armada Aeronautics, Inc., Mountain View, CA (US)

( * ) Notice: Subject to any disclaimer, the term of this patent is extended or adjusted under 35 U.S.C. 154(b) by 295 days.

(21) Appl. No.: 16/833,311

(22) Filed: Mar. 27, 2020

(65) Prior Publication Data

US 2021/0300535 A1    Sep. 30, 2021

(51) Int. Cl.
*B64C 29/02*    (2006.01)
*B64C 39/06*    (2006.01)
(Continued)

(52) U.S. Cl.
CPC ............... *B64C 29/02* (2013.01); *B60F 5/02* (2013.01); *B64C 3/14* (2013.01); *B64C 3/18* (2013.01);
(Continued)

(58) Field of Classification Search
CPC ......... B64C 29/02; B64C 37/00; B64C 39/06; B64C 39/062; B64C 39/066; B64C 39/068; B60F 5/02
See application file for complete search history.

(56) References Cited

U.S. PATENT DOCUMENTS

| 2,952,422 A | 9/1960 | Fletcher et al. |
| 3,350,035 A | 10/1967 | Schlieben |

(Continued)

FOREIGN PATENT DOCUMENTS

| DE | 4405975 A1 | 8/1995 | |
| EP | 2947009 A1 * | 11/2015 | ........... B64C 23/069 |

(Continued)

OTHER PUBLICATIONS

Talay, Theodore A.. Introduction to the Aerodynamics of Flight. NASA SP-367, 198 pages, published by NASA, Washington, D.C., 1975.*

(Continued)

*Primary Examiner* — Joseph W Sanderson
(74) *Attorney, Agent, or Firm* — Sheppard, Mullin, Richter & Hampton LLP

(57) ABSTRACT

A vertical take-off and landing (VTOL) aircraft, that may be incorporated into a personal automobile, comprises a rectangular wing including an upper wing section having a right upper wing side and a left upper wing side, a lower wing section having a right lower wing side and left lower wing side, a right vertical wing section coupled to the right upper wing side and to the right lower wing side, and a left vertical wing section coupled to the left upper wing side and to the left lower wing side, the upper wing section having an upper wing cross section with a first asymmetrical airfoil shape configured to cause lift when in forward flight, the lower wing section having a lower wing cross section with a second asymmetrical airfoil shape for causing lift when in forward flight, each of the right vertical wing section and the left vertical wing section having a vertical wing cross section with a symmetrical shape to cause lateral stability when in forward flight; two elevons on at least one of the upper wing section and the lower wing section; at least one (Continued)

rudder on each of the right vertical wing section and the left vertical wing section; a support frame coupled to the rectangular wing; and a propulsion system coupled to the support frame.

24 Claims, 17 Drawing Sheets

(51) Int. Cl.
| | | |
|---|---|---|
| *B64C 37/00* | (2006.01) | |
| *B60F 5/02* | (2006.01) | |
| *B64C 3/18* | (2006.01) | |
| *B64D 27/24* | (2006.01) | |
| *B64C 3/14* | (2006.01) | |
| *B64C 3/26* | (2006.01) | |

(52) U.S. Cl.
CPC ............... *B64C 3/26* (2013.01); *B64C 37/00* (2013.01); *B64C 39/062* (2013.01); *B64D 27/24* (2013.01); *B64C 2003/142* (2013.01)

(56) References Cited

U.S. PATENT DOCUMENTS

| | | | | |
|---|---|---|---|---|
| 3,834,654 | A * | 9/1974 | Miranda | B64C 39/068 244/45 R |
| 4,739,954 | A * | 4/1988 | Hamilton | B64C 3/18 244/131 |
| 6,098,923 | A * | 8/2000 | Peters, Jr. | B64C 5/02 244/45 R |
| 6,705,905 | B1 | 3/2004 | Tanaka et al. | |
| 7,841,559 | B1 * | 11/2010 | O'Shea | B64C 39/024 244/49 |
| 9,254,916 | B2 | 2/2016 | Yang | |
| 9,499,266 | B1 * | 11/2016 | Garreau | B64C 29/0033 |
| 9,963,228 | B2 | 5/2018 | McCullough et al. | |
| 10,011,351 | B2 * | 7/2018 | McCullough | B64C 25/04 |
| 10,183,746 | B2 | 1/2019 | McCullough et al. | |
| 10,214,285 | B2 * | 2/2019 | McCullough | B64D 1/08 |
| 10,220,944 | B2 | 3/2019 | McCullough et al. | |
| 10,227,133 | B2 * | 3/2019 | McCullough | B64D 17/80 |
| 10,232,950 | B2 | 3/2019 | McCullough et al. | |
| 10,413,763 | B2 | 9/2019 | Won et al. | |
| 10,442,522 | B2 * | 10/2019 | Oldroyd | B64C 29/02 |
| 10,501,193 | B2 * | 12/2019 | Oldroyd | B64D 27/06 |
| 10,981,649 | B2 | 4/2021 | LeGrand et al. | |
| 11,014,669 | B2 * | 5/2021 | LeGrand | B64C 11/46 |
| 11,136,119 | B2 | 10/2021 | LeGrand et al. | |
| 11,192,633 | B1 | 12/2021 | Moro-Ludena et al. | |
| 11,249,477 | B2 * | 2/2022 | LeGrand | B64C 11/46 |
| 2010/0282917 | A1 * | 11/2010 | O'Shea | B64C 39/068 244/49 |
| 2014/0124613 | A1 | 5/2014 | Yang | |
| 2016/0311518 | A1 * | 10/2016 | Wiebe | B64C 3/187 |
| 2017/0361927 | A1 * | 12/2017 | Lavagen | B64C 29/0025 |
| 2017/0371352 | A1 * | 12/2017 | Mari Mari | B64C 29/02 |
| 2018/0002011 | A1 | 1/2018 | McCullough et al. | |
| 2018/0002012 | A1 | 1/2018 | McCullough et al. | |
| 2018/0002013 | A1 | 1/2018 | McCullough et al. | |
| 2018/0002014 | A1 * | 1/2018 | McCullough | B64D 25/12 |
| 2018/0002015 | A1 * | 1/2018 | McCullough | B64D 1/08 |
| 2018/0002016 | A1 * | 1/2018 | McCullough | B64C 25/04 |
| 2018/0002026 | A1 * | 1/2018 | Oldroyd | B64C 11/46 |
| 2018/0002027 | A1 | 1/2018 | McCullough et al. | |
| 2018/0147429 | A1 | 5/2018 | Won et al. | |
| 2018/0339771 | A1 * | 11/2018 | Oldroyd | B64C 5/02 |
| 2020/0086984 | A1 | 3/2020 | LeGrand et al. | |
| 2020/0086985 | A1 | 3/2020 | LeGrand et al. | |
| 2020/0086986 | A1 * | 3/2020 | LeGrand | B64C 39/062 |
| 2020/0089227 | A1 * | 3/2020 | LeGrand | B64C 39/024 |
| 2020/0239150 | A1 | 7/2020 | Kimchi et al. | |
| 2020/0317332 | A1 | 10/2020 | Didey | |
| 2021/0031909 | A1 * | 2/2021 | Pachidis | B64C 39/12 |
| 2021/0245876 | A1 * | 8/2021 | Bianco Mengotti | B64C 27/54 |
| 2021/0300535 | A1 | 9/2021 | Petrov et al. | |
| 2021/0300546 | A1 * | 9/2021 | Kisly | B64C 25/06 |
| 2022/0063800 | A1 | 3/2022 | Suzuki | |
| 2022/0177124 | A1 * | 6/2022 | Marshall | B64D 29/02 |

FOREIGN PATENT DOCUMENTS

| | | | | |
|---|---|---|---|---|
| WO | WO-2014065719 | A1 * | 5/2014 | ......... B29C 65/5057 |
| WO | WO-2015019255 | A1 * | 2/2015 | ......... B64C 29/0016 |
| WO | WO-2016005954 | A1 * | 1/2016 | ........... B64C 39/068 |

OTHER PUBLICATIONS

Wikipedia contributors. "Decalage." Wikipedia, The Free Encyclopedia. Jun. 4, 2019. https://en.wikipedia.org/w/index.php?title=Decalage&oldid=900287836.*

Non-Final Office Action issued in U.S. Appl. No. 16/832,596, filed Mar. 27, 2020, dated Apr. 13, 2022, 11 pages.

Liu, Zhenchang, et al., "VTOL UAV Transition Maneuver Using Incremental Nonlinear Dynamic Inversion", International Journal of Aerospace Engineering, vol. 2018, Article ID 6315856, <URL: https://doi.org/10.1155/2018/6315856>, 19 pages.

Verling, Sebastian, et al., "Full Attitude Control of a VTOL Tailsitter UAV", 2016 IEEE Intennational Conference on Robotics and Automation (ICRA), Conference Paper, May 2016, 8 pages.

* cited by examiner

| | Solid Material | Core Thickness t | Core Thickness 3t |
|---|---|---|---|
| Stiffness | 1.0 | 7.0 | 37.0 |
| Flexural Strength | 1.0 | 3.5 | 9.2 |
| Weight | 1.0 | 1.03 | 1.06 |

FIG. 13

SYSTEM AND METHODS FOR PROVIDING VERTICAL TAKE OFF AND LANDING AND FORWARD FLIGHT IN A SMALL PERSONAL AIRCRAFT

CROSS REFERENCE TO RELATED APPLICATIONS

This application incorporates by reference U.S. application Ser. No. 16/832,596, entitled "Systems and Methods for Providing Vertical Take Off and Landing and Forward Flight in a Small Personal Aircraft," filed on the same date and by the same inventors herewith.

BACKGROUND

Traffic congestion is prevalent in many countries throughout the world. In fact, a recent study by INRIX concluded that, in 2016, drivers in the United States spend an average of forty-one hours per year in traffic, costing drivers nearly $305 billion.

Vertical Take-off and Landing (VTOL) aircrafts have been considered as a solution. A VTOL aircraft is an aircraft that can take off, hover, transition to forward flight, and land vertically. Thus far, no VTOL designs have been successful. While there have been a lot of successful VTOLs, such helicopters, it would be really helpful to have a VTOL with driving capabilities, e.g., a flying car.

Accordingly, there is a need for a small personal VTOL aircraft, possibly with driving capabilities that can cooperate on the current road and parking infrastructure, which may solve the problem of a short to mid-range commute and may reduce excessive traffic congestion.

SUMMARY

In some embodiments, the present invention provides a vertical take-off and landing (VTOL) aircraft, comprising a rectangular wing including an upper wing section having a right upper wing side and a left upper wing side, a lower wing section having a right lower wing side and left lower wing side, a right vertical wing section coupled to the right upper wing side and to the right lower wing side, and a left vertical wing section coupled to the left upper wing side and to the left lower wing side, the upper wing section having an upper wing cross section with a first asymmetrical airfoil shape configured to cause lift when in forward flight, the lower wing section having a lower wing cross section with a second asymmetrical airfoil shape for causing lift when in forward flight, each of the right vertical wing section and the left vertical wing section having a vertical wing cross section with a symmetrical shape to cause lateral stability when in forward flight; two elevons on at least one of the upper wing section and the lower wing section; at least one rudder on each of the right vertical wing section and the left vertical wing section; a support frame coupled to the rectangular wing; and a propulsion system coupled to the support frame to provide propulsion for the VTOL.

The asymmetrical airfoil shape may have a camber line that curves back up near the trailing edge to add a positive pitching moment and to create positive longitudinal stability when in the forward flight. The lower wing section may have a lower angle of attack than the upper wing section. The lower wing section may be arranged to shift the center of pressure of the VTOL aircraft to the upper wing section. A propulsion and cabin may be arranged so that the center of gravity of the VTOL aircraft is located between the leading edge of the wing section and the aerodynamic center of the VTOL aircraft to provide longitudinal stability to the VTOL aircraft. The upper wing section and the lower wing section may be reflexed-type airfoils to provide stabilization of the pitch moment along with the implementation of a twisted airfoil and swapped wings configuration. The upper wing section may comprise a plurality of independent sections along the lateral axis sharing a plurality of longerons. The lower wing section may comprise a plurality of independent sections along the lateral axis sharing a plurality of longerons. The propulsion system may comprise a plurality of electric propellers arranged between the upper and lower wing sections. The right vertical wing section and the left vertical wing section may be symmetrical airfoils to provide stabilization of the roll moment. The upper wing section and the lower wing section may be connectable to a vertical wing section by a corner section, each the corner section being arranged to transition between the lift forces of the upper or lower wing section and the lateral stabilizing force of the vertical wing section. The portion of a corner section may transition from the airfoil shape of the upper wing section and lower wing section connectable thereto to a tapered wing tip, the corner section thereafter transitioning from a tapered wing tip to the symmetrical cross section of a connectable vertical wing section. The transition of the corner section to a tapered wing tip may start at approximately 50% of the corner section perimeter edge that is parallel to the connectable upper wing section and lower wing section. The corner section may be arranged to shift the local aerodynamic center of a connected upper wing section and the lower wing section to the aft of the VTOL aircraft to achieve lateral stability. Each of the upper wing section, the lower wing section, the right vertical wing section and the left vertical wing section may comprise internal skeleton frames comprising ribs. The upper wing section and the lower wing section may comprise at least two longerons, the longerons having a substantially round cross section instead of rectangle cross section because of the absence of the cantilever problem. The ribs may be glued to the longerons. The longerons and ribs may be made from carbon fiber tubes. The exterior surfaces of the upper wing section and the lower wing section may comprise carbon fiber panels. The carbon fiber panels may be glued to the ribs. Each elevon may have a frame, the frame comprising a plurality of longerons and ribs, and the outer surface of each elevon comprising one or more carbon fiber panels. The carbon fiber panels may be glued to the ribs. The support frame may form a rigid chassis. The support frame may comprise cross members which extend substantially from each corner of the rectangular wing to the diagonally opposed corner of the rectangular wing, thereby forming an "X" shape. The support frame may comprise cross members which extend substantially from each end of the upper wing section to the diagonally opposed end of the lower wing section, thereby forming an "X" shape. Stabilizing members may extend vertically between the cross support frame members, crossing support frame where engines are located in order to distribute forces and discharge vibration. Stabilizing members and the support frame may be comprised of one or more of aluminum and carbon-fiber tubing with aerodynamic profiles. The propellers may be mounted to one or more of the support frame and the stabilizing members. The VTOL aircraft may have wheels with steering capability coupled to the rectangular wing.

BRIEF DESCRIPTION OF THE DRAWINGS

FIG. 13 is a chart illustrating the relative stiffness and weight of sandwich panels compared to solid panels, in accordance with some embodiments.

DETAILED DESCRIPTION

Figure 1:
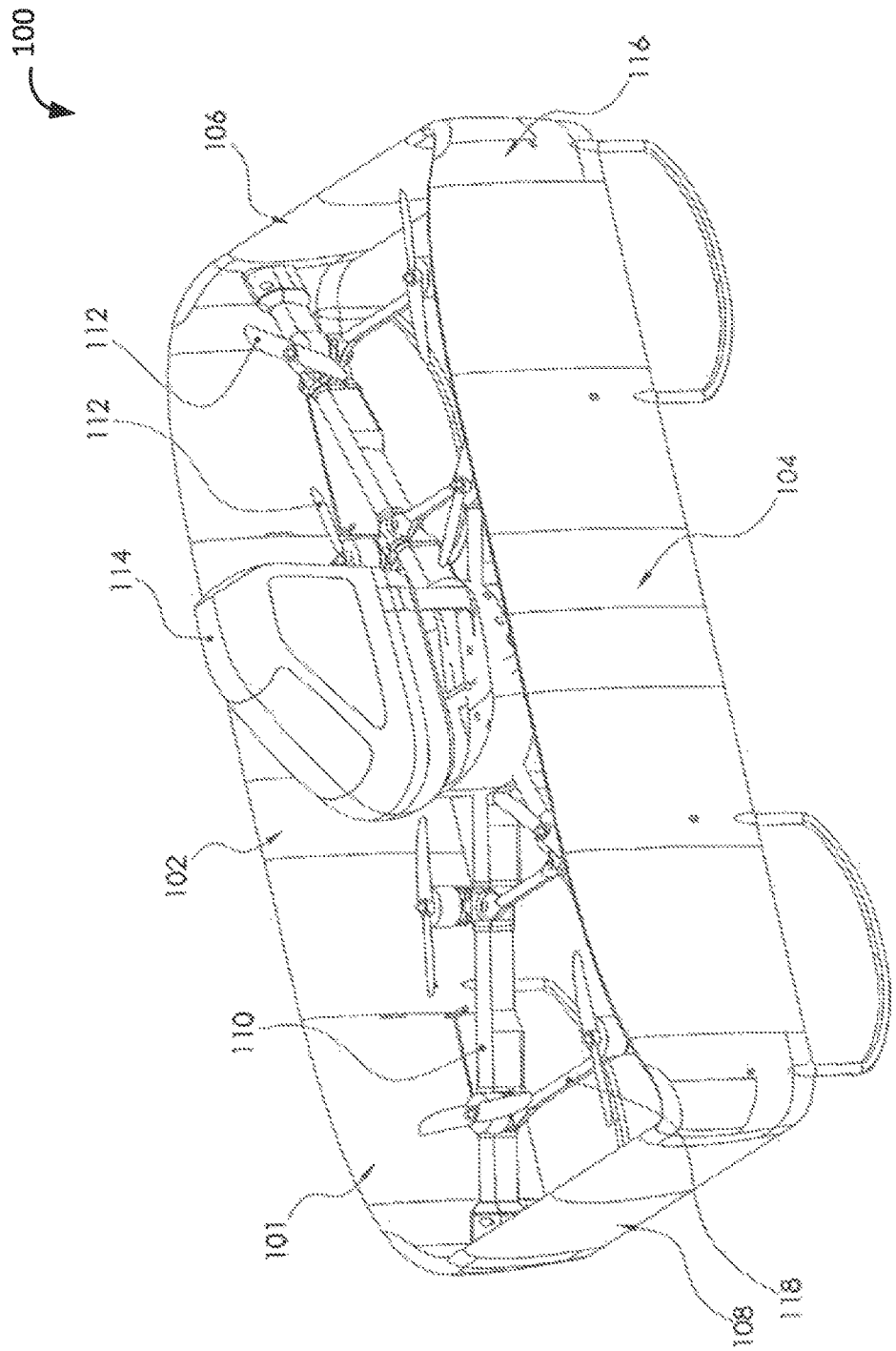
FIG. 1 is a perspective front side view of a small personal aircraft with vertical take-off and landing (a VTOL aircraft), in accordance with some embodiments.

FIG. 1 is a perspective front side view of a small personal vertical take-off and landing (VTOL) aircraft 100, in accordance with some embodiments. The VTOL aircraft 100 includes a "rectangular" wing 101. The rectangular wing 101 includes an upper wing section 102 having a right upper wing side and a left upper wing side, a lower wing section 104 having a right lower wing side and a left lower wing side, a right vertical wing section 108 (as a stabilizer) coupled to the right upper wing side and to the right lower wing side, and a left vertical wing section 106 (as a stabilizer) coupled to the left upper wing side and to the left lower wing side. Each of the wing sections is coupled together by a corner section 116. The corner sections 116 may be separate parts or parts integral to the upper wing section 102, lower wing section 104, right vertical wing section 108, or left vertical wing sections 106.

The VTOL aircraft 100 may be the size of a standard automobile. For example, the dimensions of an embodiment of the VTOL aircraft 100 may be approximately 5.5 m×2.2 m×2.0 m. An exemplary wing area may be 9.5 m2.

Figure 5:
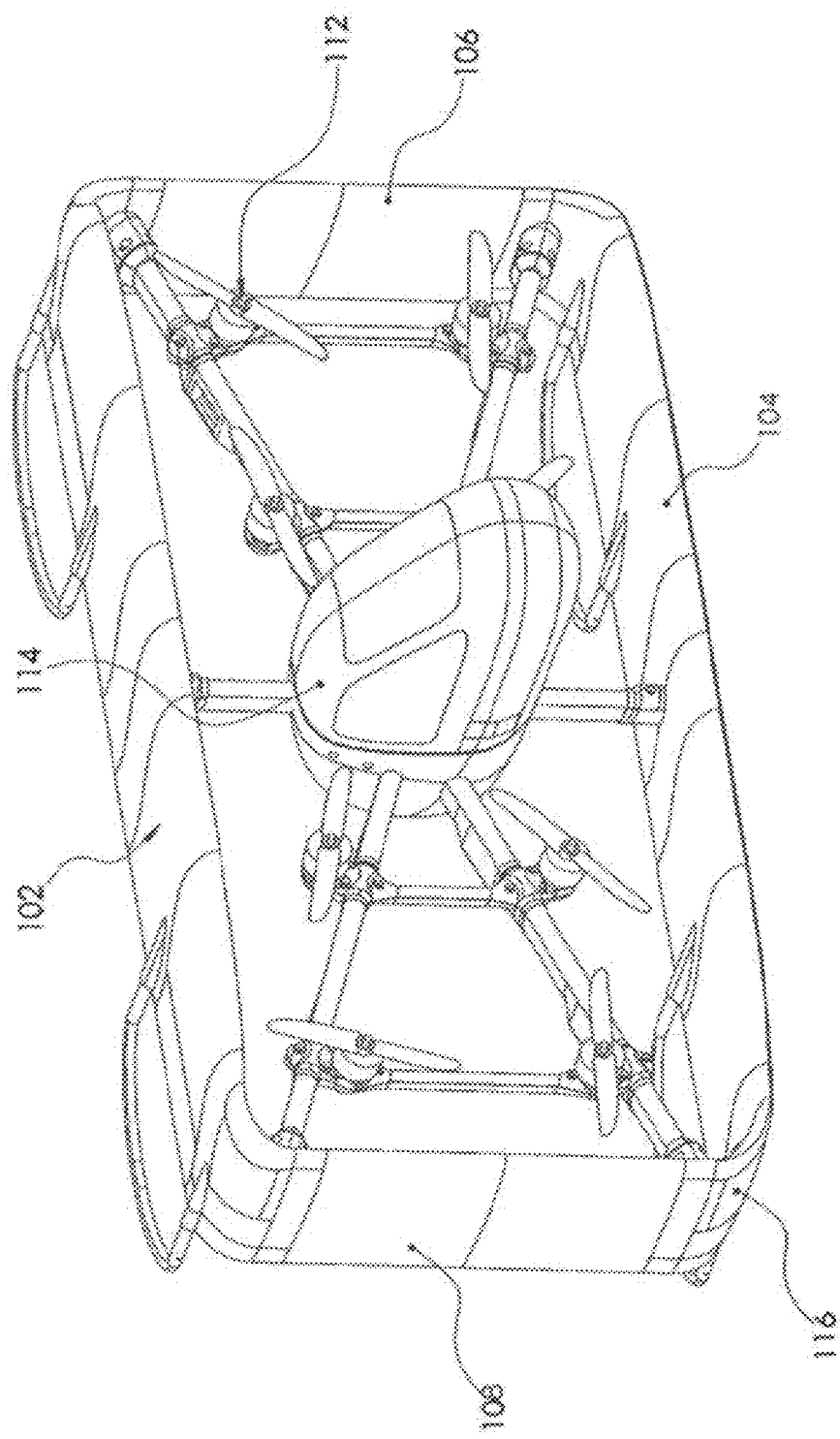
FIG. 5 is a perspective front view of a VTOL aircraft in a forward flight mode, in accordance with some embodiments.

The VTOL aircraft 100 is configured to initially take off in a vertical direction, and possibly tilted in any direction. The VTOL orientation of the VTOL aircraft 100 at rest is substantially as shown in FIG. 1. After take-off and during flight, the VTOL aircraft 100 is configured to transition to a forward orientation, as shown in FIG. 5. The upper wing section 102 is referred to as "upper," because it will become the upper wing when in the forward orientation as shown in FIG. 5. The lower wing section 104 is referred to as "lower," because it will become the lower wing when in the forward orientation. The right and left vertical wing sections 106 and 108 are referred to as "vertical," because they will be vertical when in the forward orientation. The right vertical wing section 108 is referred to as "right" because it is on the right when facing the front of the VTOL aircraft 100 in forward orientation. The left vertical wing section 106 is referred to as "left" because it is on the left when facing the front of the VTOL aircraft 100 in forward orientation.

Figure 10:
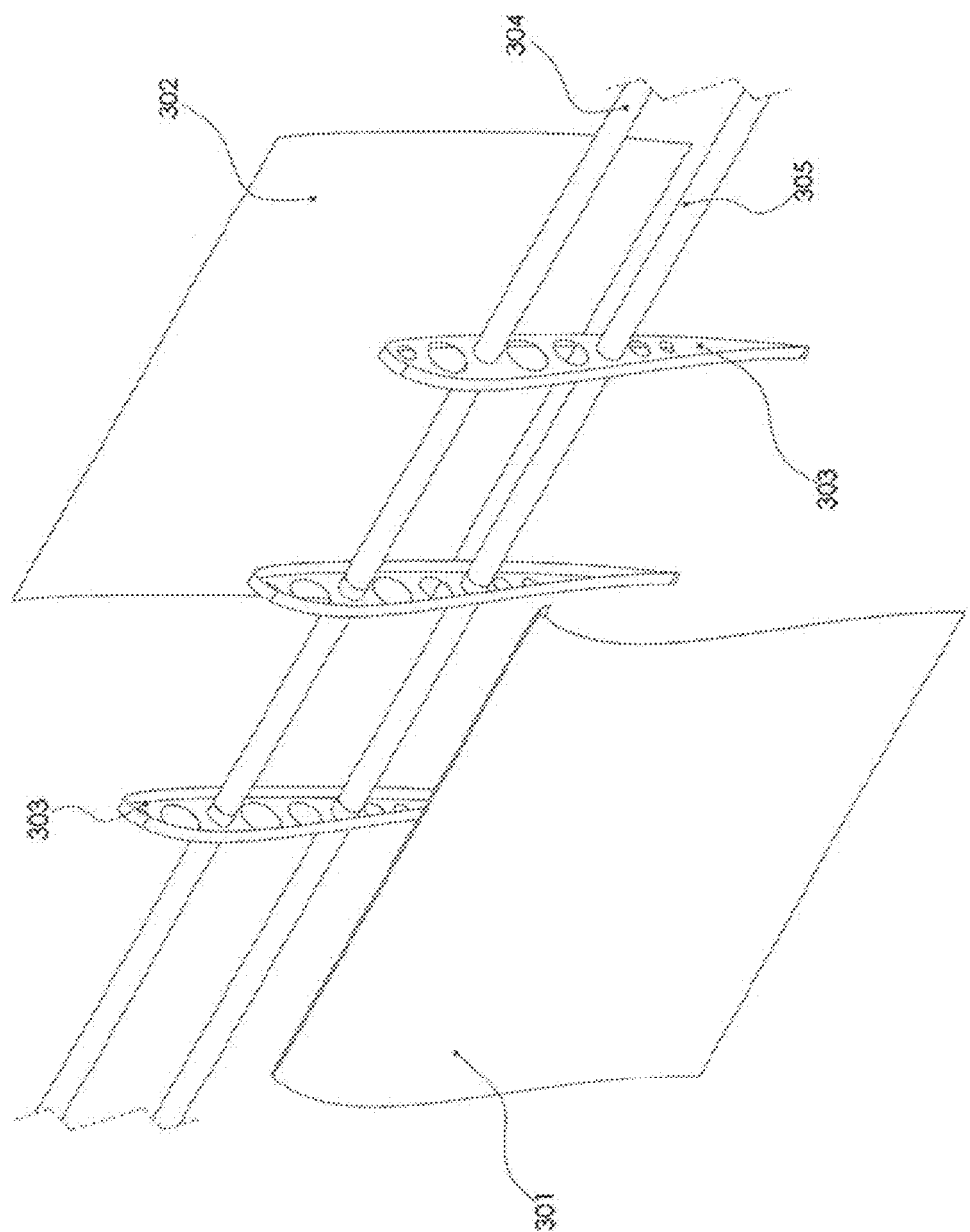
FIG. 10 is an exemplary exploded view of a wing section and/or an elevon, in accordance with some embodiments.
Figure 11:
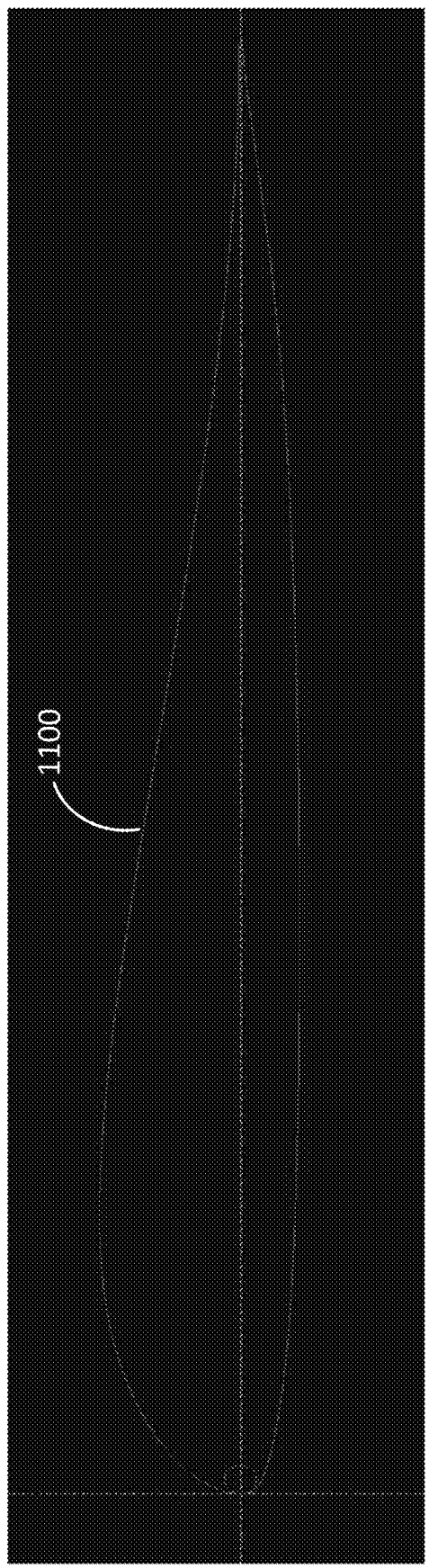
FIG. 11 is a cross-sectional view of a wing section, in accordance with some embodiments.
Figure 12:
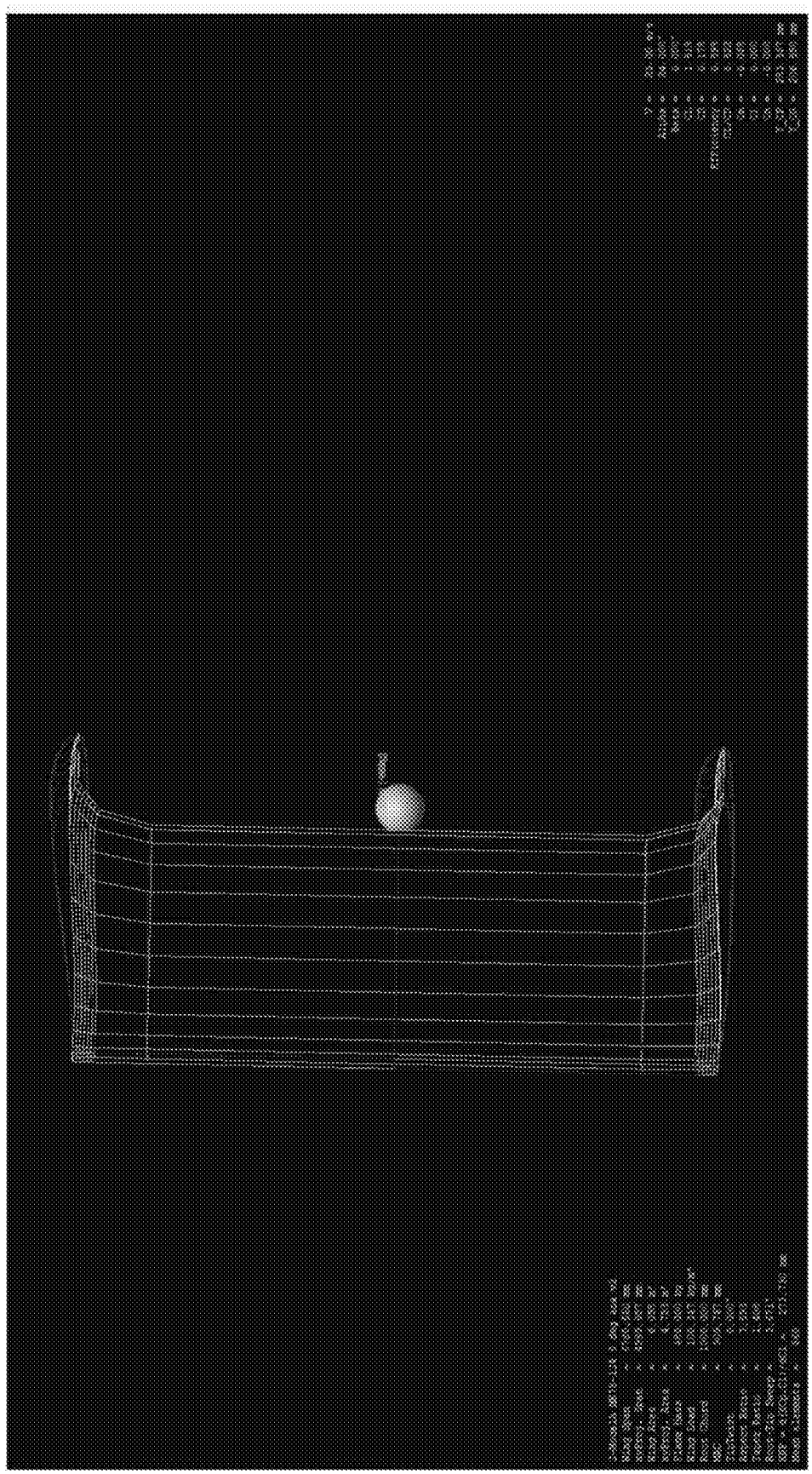
FIG. 12 is a computer model illustrating the rectangular wing shape and the center of gravity of a VTOL aircraft, in accordance with some embodiments.

The upper wing section 102 and lower wing section 104 may form the aerodynamic lifting surfaces of the VTOL aircraft 100. In some embodiments, the upper wing section 102 and the lower wing section 104 each have a cross section in the shape of an airfoil to create lift when in forward flight. The airfoil dimensions of the upper wing section 102 and the lower wing section 104 may be the same or similar, as described below. An example airfoil shape 1100 for the upper wing section 102 and the lower wing section 104 is shown in FIGS. 10-12. As shown in FIGS. 10-12, the upper wing section 102 and the lower wing section 104 use substantially the same airfoil design, in which the camber line curves back up near the trailing edge of the airfoil to add a positive pitching moment. The upper wing section and the lower wing section may be reflexed-type airfoils to provide stabilization of the pitch moment along with the implementation of a twisted airfoil and swapped wings configuration. The lower wing section 104 may have a slightly lower angle of attack than the upper wing section 102 to aid in stall recovery. It is also used to achieve roll stability as it shifts center of pressure up to the upper wing. At low speeds, the lower wing section 106 will stall first, moving the center of lift up and causing the angle of attack to fall, increasing air speed and thus exiting a stall. As shown in the tables below, the configuration allows for the center of gravity of the VTOL aircraft 100 to be located in front of the aerodynamic center (which is at about 27% of the root chord from the leading edge) to the point of about 20.7% of the root chord from the leading edge. This configuration also creates positive longitudinal static stability for the VTOL aircraft 100.

The right vertical wing section 108 and the left vertical wing section 106 may comprise two wing portions shorter than the upper wing section 102 and the lower wing section 104. The right vertical wing section 108 and the left vertical wing section 106 may be configured as symmetrical airfoils to provide stabilization of the roll moment. The cross-sectional shape of the right vertical wing section 108 and the left vertical wing section 106 may be substantially identical and may provide lateral stability when in forward flight.

The corner sections 116 are configured to smoothly transition between the upper wing section 102 and the right vertical wing section 108, the upper wing section 102 and the left vertical wing section 106, the lower wing section 104 and the right vertical wing section 108, and the lower wing sections 104 and the left vertical wing section 106. The corner sections 116 may be configured to transition between the lift forces created by the upper wing section 102 and the lower wing section 104 and the vertical stabilizing forces associated with the airfoil designs of the right vertical wing section 108 and the left vertical wing section 106.

As shown, the corner sections 116 are connected to the upper wing section 102 or the lower wing section 104 on one end of the corner section 116. The portion of the corner sections 116 adjacent to the upper wing section 102 or the lower wing section 104 transition from the airfoil shape to a tapered wing tip. The transition starts at approximately 50% of the corner section 116 perimeter edge that is parallel to the upper wing section 102 and the lower wing section 104 to create additional wing span and add additional lift and reduce wing tip vortices. This portion of the corner section 116 decreases the wing chord length and transitions the wing tip to the connected right vertical wing section 108 or left vertical wing section 106. The tapering of the end of the corner sections 116 adjacent to the upper wing section 102 and the lower wing section 104 shifts the local aerodynamic center of the wing configuration to the aft of the VTOL aircraft 100 to achieve lateral stability.

Similarly, the portion of the corner sections 116 adjacent to the right vertical wing section 108 and the left vertical wing section 106 preferably transition from an asymmetrical shape of the upper wing section 102 and the lower wing section 104 to a symmetrical airfoil design for the right vertical wing section 108 and the left vertical wing section 106 in accordance with some embodiments.

Generally, each of the upper wing section 102 and the lower wing section 104, the right vertical wing section 108 and the left vertical wing section 106 and the corner sections 116 include internal skeleton frames comprising ribs. The upper wing section 102 and the lower wing section 104 include at least two longerons of round shape with ribs attached by means of gluing. Longerons and ribs are made from carbon fiber tubes and customs profiles.

Figure 17:
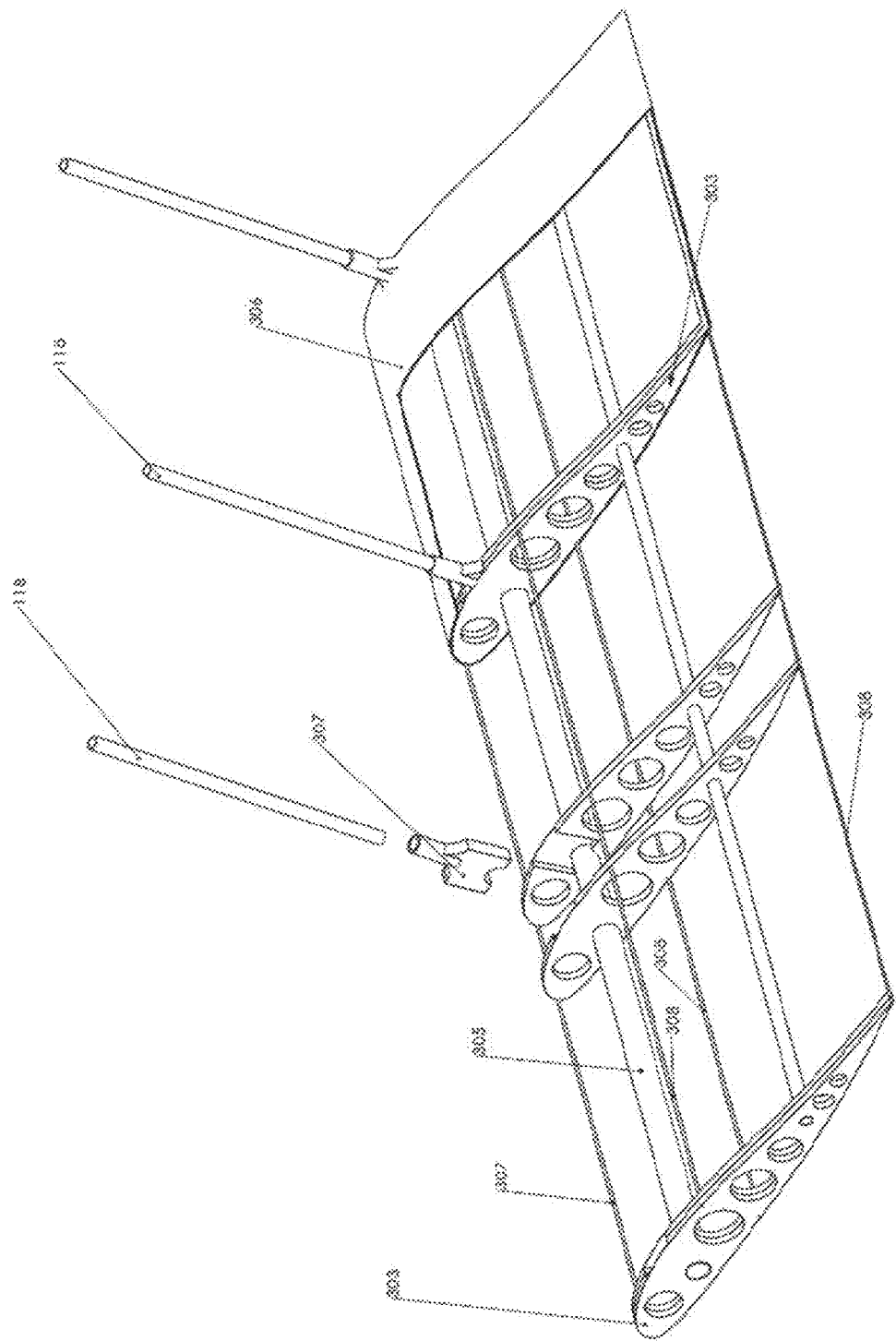
FIG. 17 is an exemplary exploded view showing modularity of the wing sections along with joints of wing frame to the support frame, in accordance with some embodiments.

The surfaces of the upper wing section 102 and the lower wing section 104 may be constructed from carbon fiber panels and attached to the ribs by the mean of gluing. Each of the upper wing section 102 and the lower wing section 104 may be made of independent sections (along the lateral axis) which share longerons as supports and structural elements. The elevons may each contain two longerons with ribs and carbon fiber panels attached by gluing. FIG. 10 shows an exemplary exploded view of the structure of a wing section and/or an elevon in accordance with some embodiments. A wing section includes longerons 304, 305 extending the length of the wing section and interconnecting with one or more ribs 303. The top surface 302 and bottom surface 301 of the wing section and/or elevon may be constructed from carbon fiber panels. FIG. 17 shows exemplary exploded view of the modularity of the wing sections, each wing section consists of two ribs 303 and carbon fiber panel 306. Ribs 303 are attached by means of screw connection to the joint 307. Joint 307 is attached to the stabilizing member 118 of the support frame. The carbon fiber panel 306 may have additional support by means of spars 308. The carbon fiber panels may be sandwich type panels having a varying thickness and highly enhanced strength and stiffness as illustrated in FIG. 13 and as indicated in the tables below.

The VTOL aircraft 100 may include a support frame 110 configured to stabilize the rectangular wing 101 and form a rigid chassis, without forming a wind barrier. The support frame 110 may include cross members 111 configured to cross substantially diagonally across the rectangular wing 101, substantially corner to cross corner in both directions, thereby forming an "X" shape. The support frame 110 may include stabilizing members 118 crossing vertically between the cross members 111. The support frame 110 may be made from aluminum and carbon-fiber tubing with aerodynamic profiles.

In some embodiments, the support frame 110 may be used to support a cabin 114 thereon, possibly substantially centrally, e.g., at the center of the "X" shape of the cross members 111. The cabin 114 may be used to house the pilot and any passengers. The support frame 110 may further be used to support a set of propellers 112. As shown, the VTOL aircraft 100 may include eight propellers 112 spread between the upper wing section 102 and the lower wing section 104, with four propellers spread between the cabin 114 and the right vertical wing section 108, and the other four propellers spread between the cabin 114 and the second wing section 108.

The support frame 110 may include sections configured to allow flexion in a manner to enable stability while in forward flight. For example, when making a turn, the VTOL aircraft 100 may experience adverse yaw forces due to the configuration of the rectangular wing 101 and the use of elevons. This configuration of the support frame 110 allows the rectangular wing 101 sufficient twist for the outer section to angle downwards and provide negative lift. This reverses the adverse yaw forces and eliminates the need for a vertical rudder or differential-drag spoilers.

The cross members 111 may connect at one end to the cabin 114. The other ends of the cross members 111 may be fastened to the frames forming the skeletons for the upper wing section 102 and the lower wing section 104. The connection points between the upper wing section 102 and the lower wing section 104 and the support frame 110 may be located at the wing ribs. In some embodiments, there are six ribs in the upper wing section 102 and the lower wing section 104 that are attached to the support frame 110.

The VTOL aircraft 100 also includes a propulsion system to enable take-off and forward flight. The propulsion system preferably includes the eight propellers 112 supported on the support frame 110. The propellers 112 may be three-blade propellers with variable pitch adjustment in the range of 17-90 degrees and with electric propulsion motors based on permanent magnets approach—BLDC with advanced phase control—Field oriented Control (FOC) implemented in the speed controllers (ESC). The motors may be capable of delivering 35 KW of constant power and 60 KW of pick power (5 sec). The motor electronic controls and motor housing may be equipped with passive cooling system based on heat-transfer tubes with heat dissipation in the airflow from the rotating propellers. The motors may turn the propellers at full throttle in the range of 5000-7000 RPM, and the propellers will have a tip speed of approximately 0.8 M and up to 0.95 M. The rotation speed of propellers 112 and variable pitch of the propeller blades may be controlled individually by the flight controller to allow differential thrust in vertical take-off, landing and forward flight modes. The propellers 112 may have a diameter of 34-36 inches.

The VTOL aircraft 100 may include batteries to power the propellers 112. The VTOL aircraft 100 may utilize standard off-the-shelf rechargeable Lithium-ion/Polymer batteries. Battery packaging may be based on payloads. Battery capacity may depend on use cases (e.g., payload, range). For a payload of 150 kg and flight time of 40 minutes, battery capacity may be projected to be 450 Ah or 30-40 kWh. Battery charging may be performed via electric car charging stations.

Batteries may be distributed in several places around the VTOL aircraft 100. For example, batteries may be included in the cabin, above the frame support 110 and in the leading edge of the rectangular wing 101. The distribution may be arranged to shift the center of gravity of the VTOL aircraft 100 before the aerodynamic center of the airfoils to achieve positive longitudinal flight stability.

Although not shown, the VTOL aircraft 100 may include four wheels coupled to the rectangular wing 101, and generally positioned in typical positions as on a typical automobile. The four wheels may be steered by a steering wheel located in the cabin. The four wheels may be driven by motors (not shown) or by the propellers 112, which may be directed to propel the VTOL aircraft forwards and/or backwards.

Figure 2:
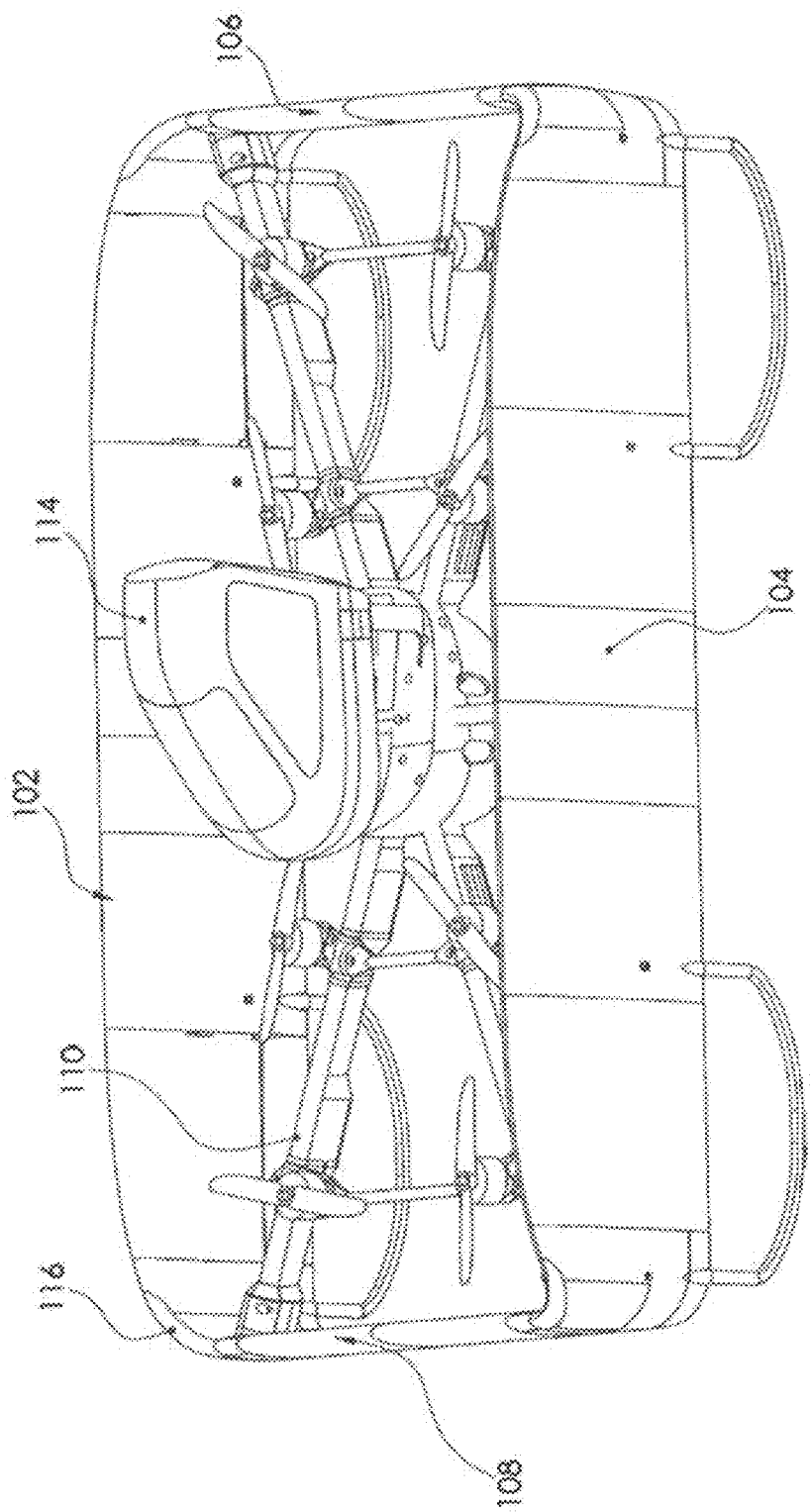
FIG. 2 is a perspective side view of a VTOL aircraft, in accordance with some embodiments.

FIG. 2 is a perspective side view of the VTOL aircraft 100, in accordance with some embodiments.

Figure 3:
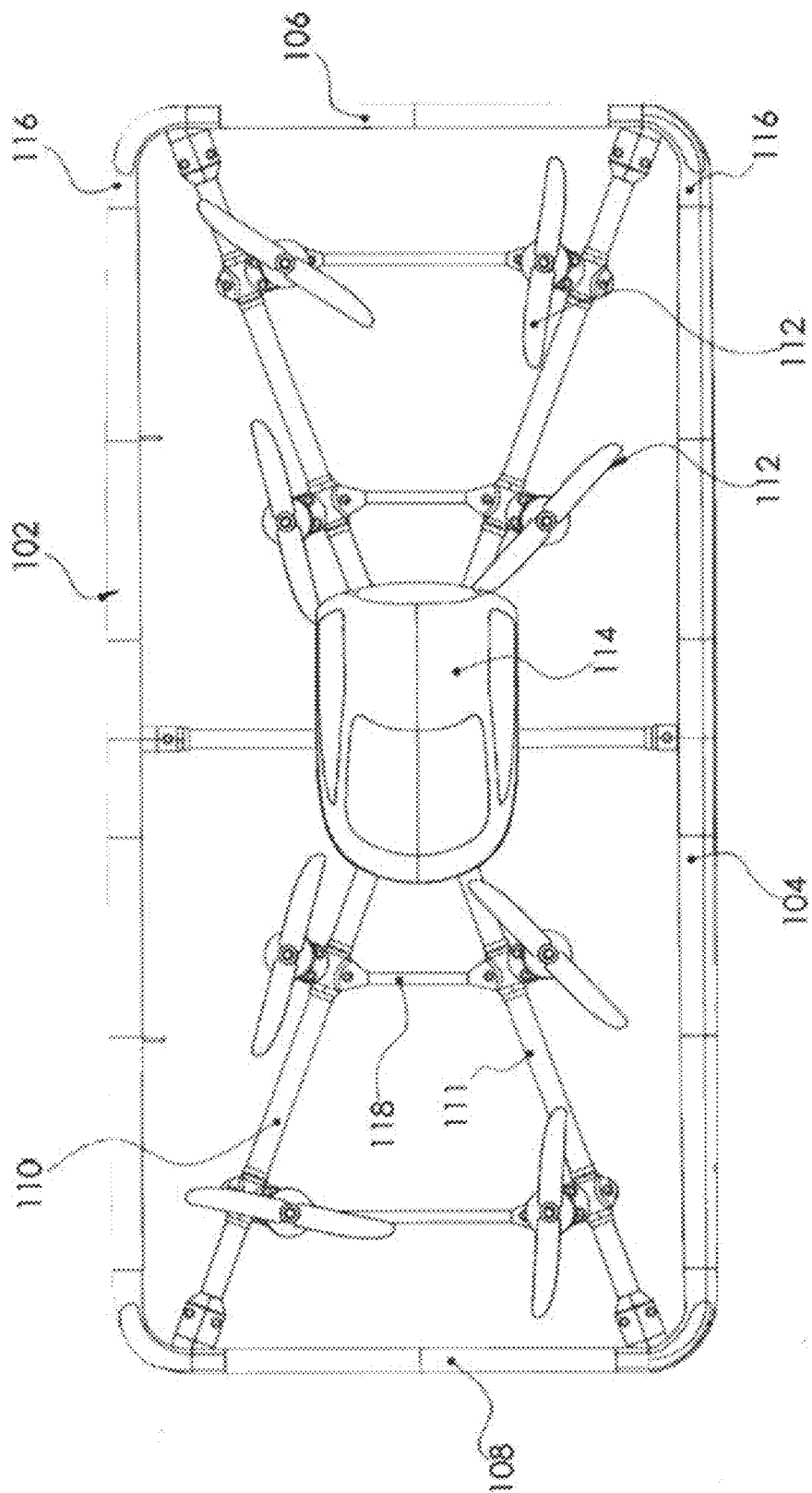
FIG. 3 is a top view of a VTOL aircraft, in accordance with some embodiments.

FIG. 3 is a top view of the VTOL aircraft 100, in accordance with some embodiments.

Figure 4:
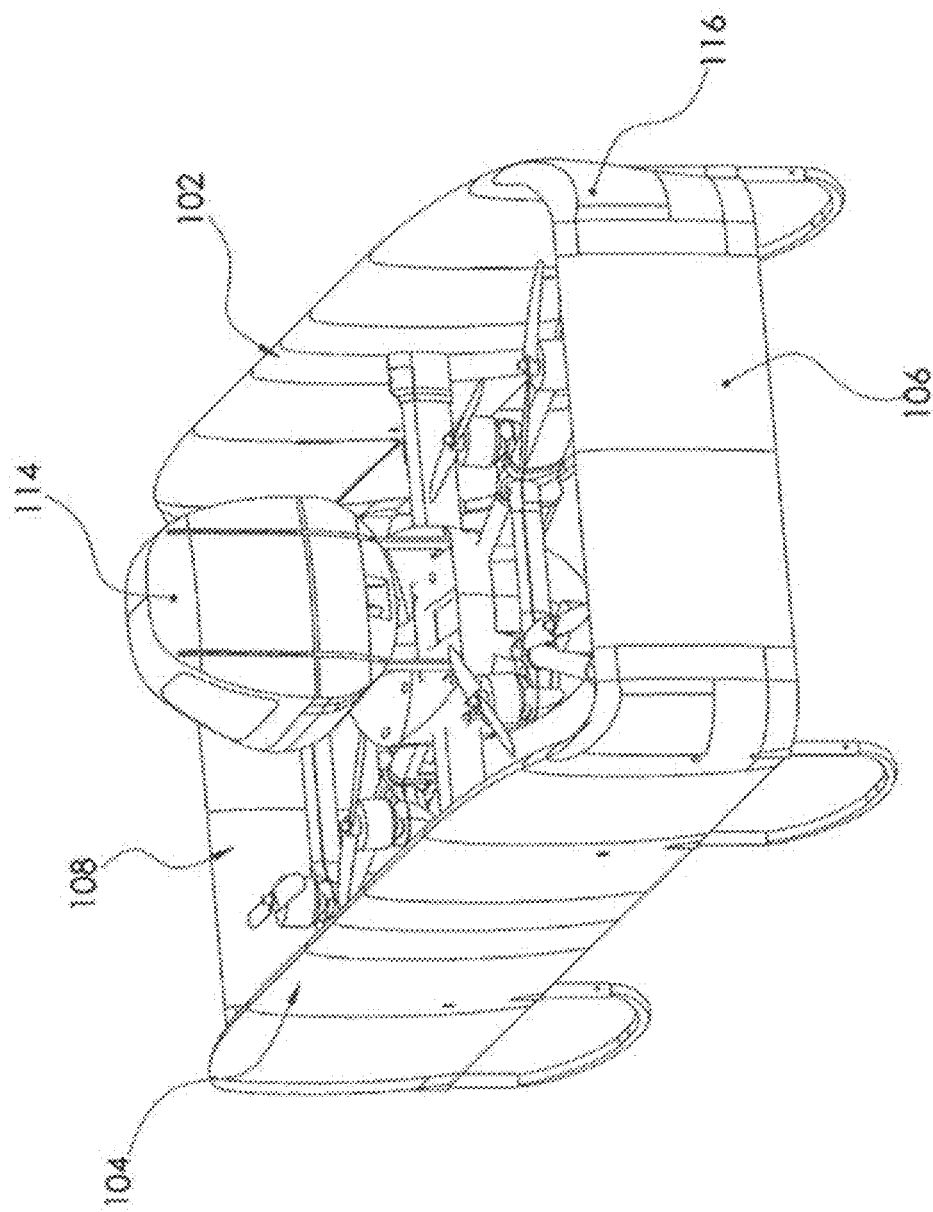
FIG. 4 is a perspective rear view of a VTOL aircraft, in accordance with some embodiments.

FIG. 4 is a perspective rear view of the VTOL aircraft 100, in accordance with some embodiments.

FIG. 5 is a perspective front view of the VTOL aircraft 100 in a forward flight orientation, in accordance with some embodiments. As shown in FIG. 5, the cabin 114 may be configured to rotate from a sideways direction to a forward direction so that the passengers remain seated comfortably relative to gravity.

Figure 6:
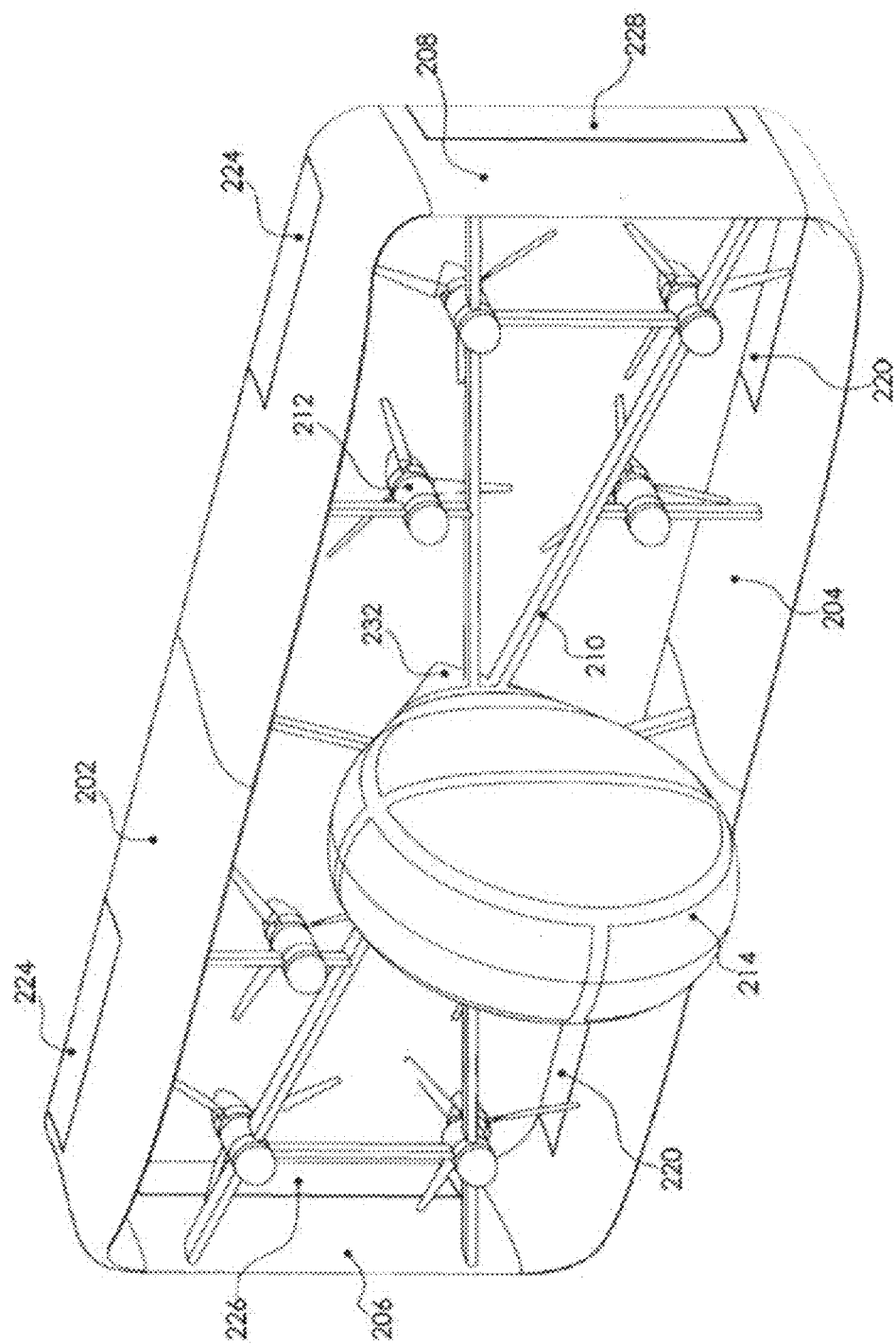
FIG. 6 is a perspective front view of a VTOL aircraft in a forward flight mode, in accordance with some embodiments.

FIG. 6 is a perspective front view of a VTOL aircraft 200, in accordance with some embodiments. The VTOL aircraft 200 is substantially similar to the VTOL aircraft 100 shown and discussed with reference to FIGS. 1-5. The VTOL aircraft 200 shows some additional details included in the VTOL aircraft 100 but not shown in FIGS. 1-5, such as the elevons 220 on the lower wing section 204, the elevons 224 on the upper wing section 202, and the rudders 226 and 228 on the right and left vertical wing sections 206 and 208.

Some differences between the VTOL aircraft 200 relative to the VTOL aircraft 100 include a different cabin 214 relative to the cabin 114, a different support frame 210 pattern relative to support frame 110, and rear-side positioned propellers 212 relative to front-side positioned propellers 112.

Like the VTOL aircraft 100, the VTOL aircraft 200 includes a "rectangular" wing 201. The rectangular wing 201 includes an upper wing section 202 having a right upper wing side and a left upper wing side, a lower wing section 204 having a right lower wing side and a left lower wing side, a right vertical wing section 206 (as a stabilizer) coupled to the right upper wing side and to the right lower wing side, and a left vertical wing section 208 (as a stabilizer) coupled to the left upper wing side and to the left lower wing side. Each of the wing sections is coupled together by a corner section 216. Corner sections 216 may be separate parts or parts integral to the upper wing section 202, lower wing section 204, right vertical wing section 206, or left vertical wing sections 208.

Like the VTOL aircraft 100, the VTOL aircraft 200 may be the size of a standard automobile. For example, the dimensions of an embodiment of the VTOL aircraft 200 may be approximately 5.5 m×2.2 m×2.0 m. An exemplary wing area may be 11 m2.

The VTOL aircraft 200 is configured to initially take off in a vertical direction, and possibly tilted in any direction. The VTOL orientation of the VTOL aircraft 200 is substantially as shown in FIG. 1. After take-off and during flight, the VTOL aircraft 200 is configured to transition to a forward orientation, as shown in FIG. 6. Like the VTOL aircraft 100, the upper wing section 202 is referred to as "upper," because it will become the upper wing when in the forward orientation as shown in FIG. 6. The lower wing section 204 is referred to as "lower," because it will become the lower wing when in the forward orientation. The right and left vertical wing sections 206 and 208 are referred to as "vertical," because they will be vertical when in the forward orientation. The right vertical wing section 206 is referred to as "right" because it is on the right when facing the front of the VTOL aircraft 200 in forward orientation. The left vertical wing section 208 is referred to as "left" because it is on the left when facing the front of the VTOL aircraft 200 in forward orientation.

The upper wing section 202 and lower wing section 204 may form the aerodynamic lifting surfaces of the VTOL aircraft 200. In some embodiments, the upper wing section 202 and the lower wing section 204 each have a cross section in the shape of an airfoil to create lift when in forward flight. The airfoil dimensions of the upper wing section 202 and the lower wing section 204 may be the same or similar, as described below. An example airfoil shape 1100 for the upper wing section 202 and the lower wing section 204 is shown in FIGS. 10-12. As shown in FIGS. 10-12, the upper wing section 202 and the lower wing section 204 use substantially the same airfoil design, in which the camber line curves back up near the trailing edge of the airfoil to add a positive pitching moment. The lower wing section 204 may have a slightly lower angle of attack than the upper wing section 202 to aid in stall recovery. At low speeds, the lower wing section 206 will stall first, moving the center of lift up and causing the angle of attack to fall, increasing air speed and thus exiting a stall. As shown in the tables below, the configuration allows for the center of gravity of the VTOL aircraft 200 to be located in front of the aerodynamic center (which is at about 27% of the root chord from the leading edge) to the point of about 20.7% of the root chord from the leading edge. This configuration also creates positive longitudinal static stability for the VTOL aircraft 200.

The right vertical wing section 206 and the left vertical wing section 208 may comprise two wing portions shorter than the upper wing section 202 and the lower wing section 204. The right vertical wing section 206 and the left vertical wing section 208 may be configured as symmetrical airfoils to provide stabilization of the roll moment. The cross-sectional shape of the right vertical wing section 206 and the left vertical wing section 208 may be substantially identical and may provide lateral stability when in forward flight.

Like the corner sections 116, the corner sections 216 are configured to smoothly transition between the upper wing section 202 and the right vertical wing section 206, the upper wing section 202 and the left vertical wing section 206, the lower wing section 204 and the right vertical wing section 206, and the lower wing sections 204 and the left vertical wing section 208. The corner sections 216 may be configured to transition between the lift forces created by the upper wing section 202 and the lower wing section 204 and the vertical stabilizing forces associated with the airfoil designs of the right vertical wing section 206 and the left vertical wing section 208.

As shown, the corner sections 216 may be connected to the upper wing section 202 and the lower wing section 204 on one end of the corner section 216. The portion of the corner sections 216 adjacent to the upper wing section 202 and the lower wing section 204 transition from the airfoil shape to a tapered wing tip. The transition starts at approximately 50% of the corner section 216 perimeter edge that is parallel to the upper wing section 202 and the lower wing section 204 to create additional wing span and add additional lift and reduce wing tip vortices. This portion of the corner section 216 decreases the wing chord length and transitions the wing tip to the right vertical wing section 206 and the left vertical wing section 208. The tapering of the end of the corner sections 216 adjacent to the upper wing section 202 and the lower wing section 204 shifts the local aerodynamic center of the wing configuration to the aft of the VTOL aircraft 200.

Similarly, the portion of the corner sections 216 adjacent to the right vertical wing section 206 and the left vertical wing section 208 transition from an asymmetrical shape of the upper wing section 202 and the lower wing section 204 to the symmetrical airfoil designs of the right vertical wing section 206 and the left vertical wing section 208.

Generally, each of the upper wing section 202 and the lower wing section 204, the right vertical wing section 206 and the left vertical wing section 208 and the corner sections 216 include internal skeleton frames comprising ribs. The upper wing section 202 and the lower wing section 204 preferably include at least two longerons of round shape with ribs attached by means of gluing. Longerons and ribs are preferably made from carbon fiber tubes and customs profiles.

The surfaces of the upper wing section 202 and the lower wing section 204 may be constructed from carbon fiber panels and attached to the ribs by the mean of gluing. Each of the upper wing section 202 and the lower wing section 204 may be made of independent sections (along the lateral axis) which share longerons as supports and structural elements. The elevons may each contain two longerons with ribs and carbon fiber panels attached by gluing. FIG. 10 shows an exemplary exploded view of the structure of a wing section and/or an elevon in accordance with some embodiments. A wing section includes longerons 304, 305 extending the length of the wing section and interconnecting with one or more ribs 303. The top surface 302 and bottom surface 301 of the wing section and/or elevon may be constructed from carbon fiber panels. The carbon fiber panels may be sandwich type panels having a varying thickness and highly enhanced strength and stiffness as illustrated in FIG. 13 and as indicated in the tables below.

The VTOL aircraft 200 may include a support frame 210 configured to stabilize the rectangular wing 201 and form a rigid chassis, without forming a wind barrier. Like the support frame 110, the support frame 210 may include cross members 211 configured to cross substantially diagonally across the rectangular wing 201, substantially corner to cross corner in both directions, thereby forming an "X" shape. The support frame 210 may include stabilizing members 218 crossing vertically between the cross members 211. The support frame 210 may be made from alumina and carbon-fiber tubing with aerodynamic profiles.

In some embodiments, the support frame 210 may be used to support a cabin 214 thereon, possibly substantially centrally, e.g., at the center of the "X" shape of the cross members 211. The cabin 214 may be used to house the pilot and any passengers. The support frame 210 may further be used to support a set of propellers 212. As shown, the VTOL aircraft 100 may include eight propellers 212 spread between the upper wing section 202 and the lower wing section 204, with four propellers 212 spread between the cabin 214 and the right vertical wing section 206, and the other four propellers 212 spread between the cabin 214 and the second wing section 208.

The support frame 210 may include sections configured to allow flexion in a manner to enable stability while in forward flight. For example, when making a turn, the VTOL aircraft 200 may experience adverse yaw forces due to the configuration of the rectangular wing 201 and the use of elevons 220 and 224. This configuration of the support frame 110 allows the rectangular wing 201 sufficient twist for the outer section to angle downwards and provide negative lift. This reverses the adverse yaw forces and eliminates the need for a vertical rudder or differential-drag spoilers.

The cross members 211 may connect at one end to the cabin 214. The other ends of the cross members 211 may be fastened to the frames forming the skeletons for the upper wing section 202 and the lower wing section 204. The connection points between the upper wing section 202 and the lower wing section 204 and the support frame 210 may be located at the wing ribs. In some embodiments, there are six ribs in the upper wing section 202 and the lower wing section 204 that are attached to the support frame 210.

Like the VTOL aircraft 100, the VTOL aircraft 200 also includes a propulsion system to enable take-off and forward flight. The propulsion system includes the eight propellers 212 supported on the support frame 210. The propellers 212 may be three-blade propellers with variable pitch adjustment in the range of 18-90 degrees and with electric propulsion motors based on permanent magnets approach—BLDC with advanced phase control—Field oriented Control (FOC). The motors may be capable of delivering 35 KW of constant power and 60 KW of pick power (5 sec). The motor electronic controls and motor housing may be equipped with passive cooling system based on heat-transfer tubes with heat dissipation in the airflow from the rotating propellers. The motors may turn the propellers at full throttle in the range of 5000-6000 RPM, and the propellers will have a tip speed of approximately 0.8 M. The rotation speed of propellers 212 and variable pitch of the propeller blades may be controlled individually by the flight controller to allow differential thrust in vertical take-off, landing and forward flight modes. The propellers 212 may have a diameter of 34-36 inches.

Like the VTOL aircraft 100, the VTOL aircraft 200 may include batteries to power the propellers 212. The VTOL aircraft 200 may utilize standard off-the-shelf rechargeable Lithium-ion polymer batteries. Battery packaging may be based on payloads. Battery capacity may depend on use cases (e.g., payload, range). For a payload of 150 kg and flight time of 40 minutes, battery capacity may be projected to be 450 Ah. Battery charging may be performed via electric car charging stations.

Batteries may be distributed in several places around the VTOL aircraft 200. For example, batteries may be included in the cabin, above the frame support 210 and in the leading edge of the rectangular wing 201. The distribution may be arranged to shift the center of gravity of the VTOL aircraft 200 before aerodynamic center of the airfoils to improve aerodynamics and flight stability.

As illustrated in FIG. 6, the right vertical wing section 206 includes a first rudder 226, and the left vertical wing section 208 include a second rudder 228. The upper wing section 202 has elevons 224, and the lower wing section 204 has elevons 220. The elevons 220 and 224 may be positioned close to the transition where the first and left vertical wing sections 206 and 208 control the wing pitching and rolling moments. Each elevon 220 and 224 may have a chord length of approximately 25% of the wing chord length. The width of the elevons may me be about 1.5 diameters of propellers. Elevons 220 and 224 combine the functions of ailerons and elevators in a typical fixed wing aircraft design. Elevons and rudders also may be used in vertical flight for augmenting positional stability along with body tilting to fight with position deviation in windy conditions. Further, the elevons 220 and 224 may be located between first and second and between fifth and sixth ribs attached to the support frame 210.

In forward flight, the VTOL aircraft 200 may be controlled by the elevons 220 and 224 which combine controls of ailerons and elevators. Flap function from elevons 220 and 224 is also possible. Active longitudinal stability may be based on thrust vectoring or differential thrust created by the counter-rotation of, or changing the rotational speed of, propellers 212 and controlling the rudders 226 and 228. Pitch control may performed by deflecting all elevons 220 and 224 up and down and changing their positive pitching moment as well as by differential thrust between upper and lower row of propellers. Differential thrust can be achieved by changing the rotating speed of the propellers 212 and/or changing propeller pitch. Yaw control may be performed by differential thrust of the outer rows of propellers 212. Propeller thrust may be controlled individually by changing the rotation speed and/or pitch angle. Roll control may be performed by deflecting the left and right pairs of elevons 220 and 224 up and down in opposite directions. The VTOL aircraft may include a built-in inertial management unit to enable the flight controller to control the roll position by reading current values and changing speeds.

Figure 7B:
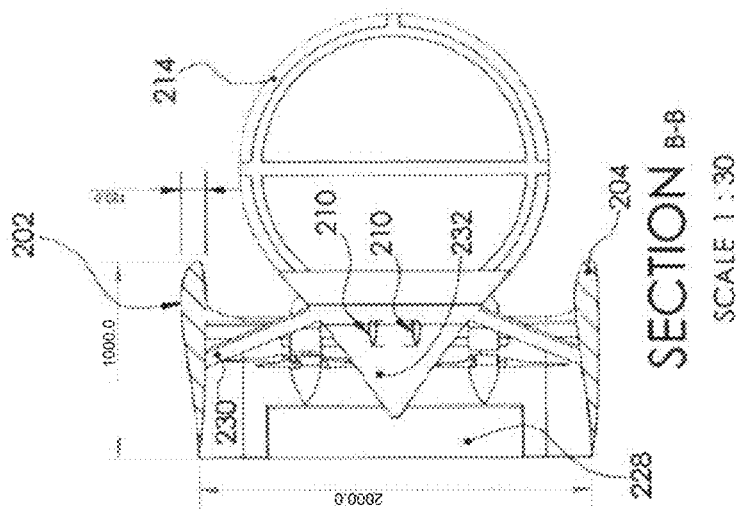
FIG. 7B is a cross-sectional view of a VTOL aircraft taken substantially along line B-B of FIG. 7A, in accordance with some embodiments.
Figure 7A:
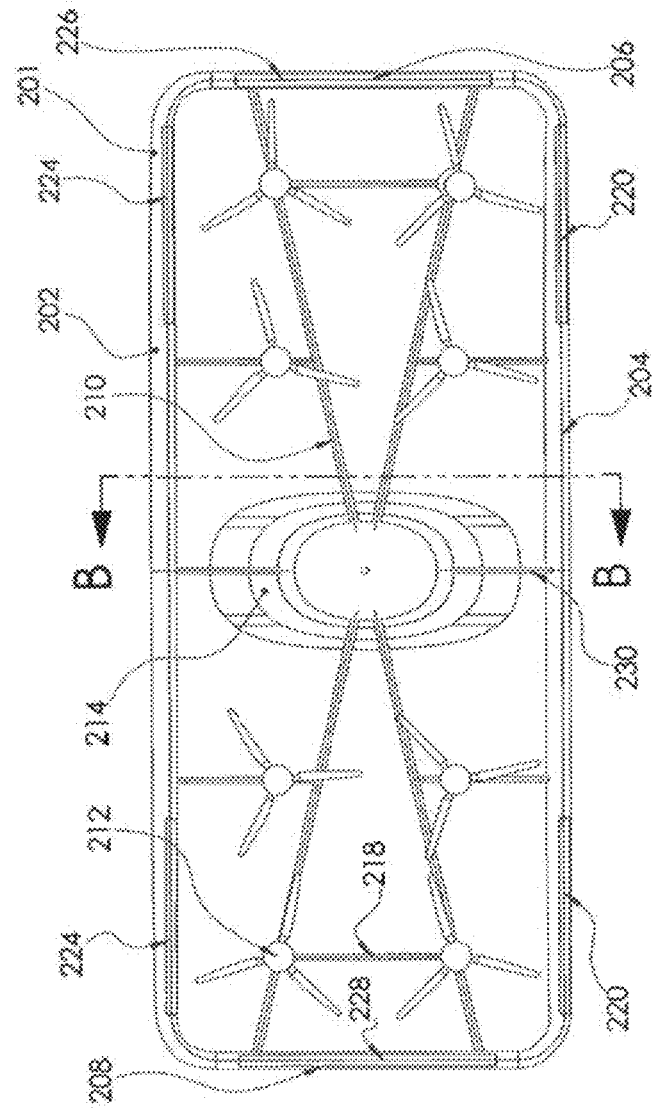
FIG. 7A is a rear view of a VTOL aircraft in a forward flight mode, in accordance with some embodiments.

FIG. 7A is a rear view of the VTOL aircraft 200 in a forward flight mode, in accordance with some embodiments. FIG. 7B is a cross-sectional view of a VTOL aircraft 200 taken substantially along line B-B of FIG. 7A, in accordance with some embodiments. As shown, VTOL aircraft 200 includes a fairing 232.

Figure 8:
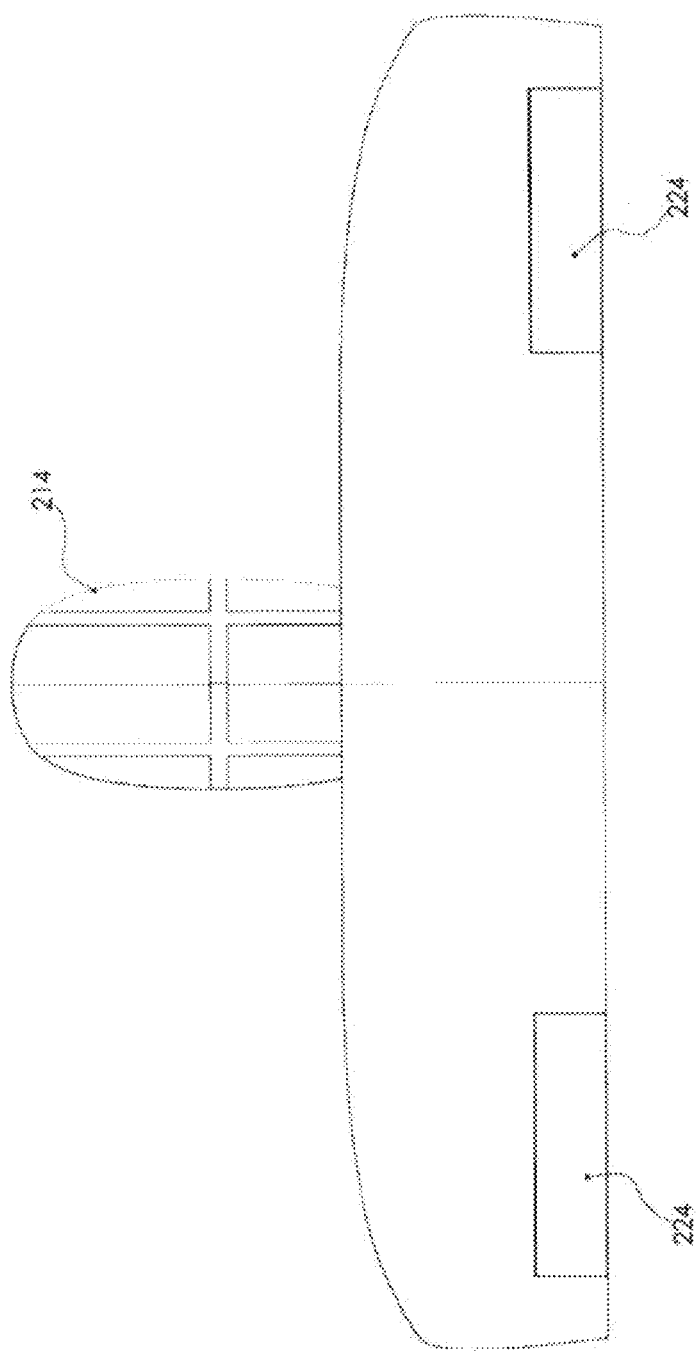
FIG. 8 is a top view of a VTOL aircraft in a forward flight mode, in accordance with some embodiments.

FIG. 8 is a top view of a VTOL aircraft 200 in a forward flight mode, in accordance with some embodiments. As illustrated in FIG. 8, the continuous shape of the rectangular wing 101 and 201 fully encases all propellers 112 and 212 to protect the surroundings from the propellers 112 and 212 and the propellers 112 and 212 from the outside objects during take-off and landing.

Figure 9:
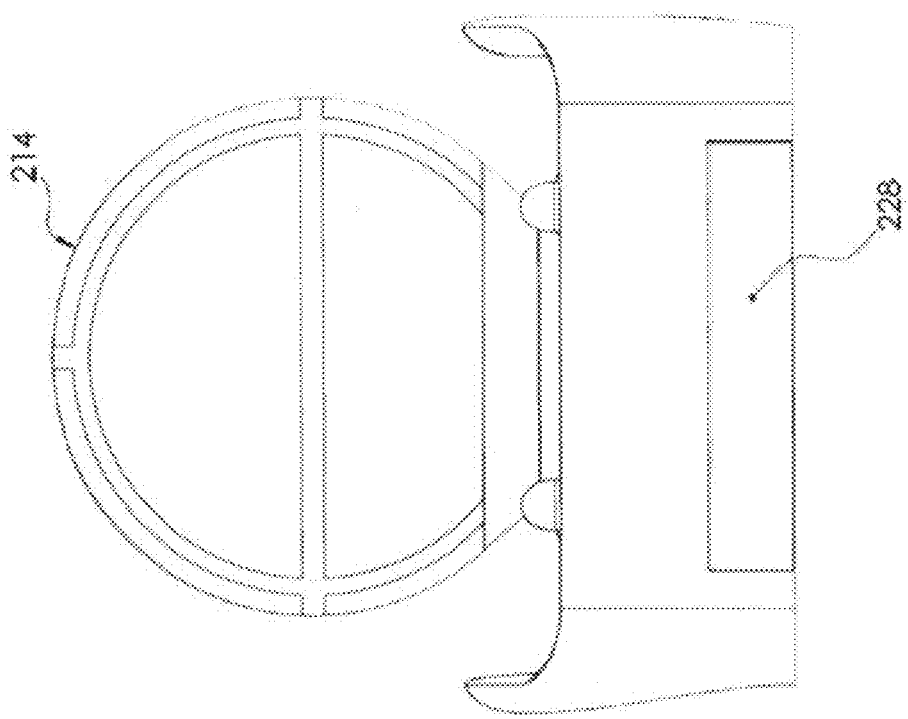
FIG. 9 is a side view of a VTOL aircraft, in accordance with some embodiments.

FIG. 9 is a side view of a VTOL aircraft 200, in accordance with some embodiments.

FIG. 10 is an exemplary exploded view of a wing section and/or elevon, in accordance with some embodiments.

FIG. 11 is a cross-sectional view of a wing section, e.g., the upper wing section 102 and 202 and the lower wing section 104 and 204, in accordance with some embodiments.

FIG. 12 is a computer model illustrating the shape and center of gravity of the rectangular wing 101 and 201, in accordance with some embodiments. The computer model shows the following specifications:

| 2-ModelA MH78-12% 8 deg AoA v2 | |
|---|---|
| Wing Span | 6780.560 mm |
| xyProj. Span | 4999.987 mm |
| Wing Area | 6.055 m$^2$ |
| xyProj. Area | 4.783 m$^2$ |
| Plane Mass | 480.000 kg |
| Wing Load | 100.347 kg/m$^2$ |
| Root Chord | 1000.000 mm |
| MAC | 909.767 mm |
| TipTwist | 0.000° |
| Aspect Ratio | 7.593 |
| Taper Ratio | 1.408 |
| Root-Tip Sweep | 3.671° |
| XNP = d(XCp.C1)/dC1) | 273.730 mm |
| Mesh Elements | 660 |
| V | 23.00 m/s |
| Alpha | 24.000° |
| Beta | 0.000° |

| 2-ModelA MH78-12% 8 deg AoA v2 | |
|---|---|
| -continued | |
| CL | 1.519 |
| CD | 0.178 |
| Efficiency | 0.599 |
| CL/CD | 8.522 |
| Cm | −0.068 |
| Cl | 0.000 |
| Cn | −0.000 |
| X_CP | 253.567 mm |
| X_CG | 206.550 mm |

FIG. 13 is a chart illustrating the relative stiffness and weight of sandwich panels compared to solid panels, in accordance with some embodiments.

Figure 14:
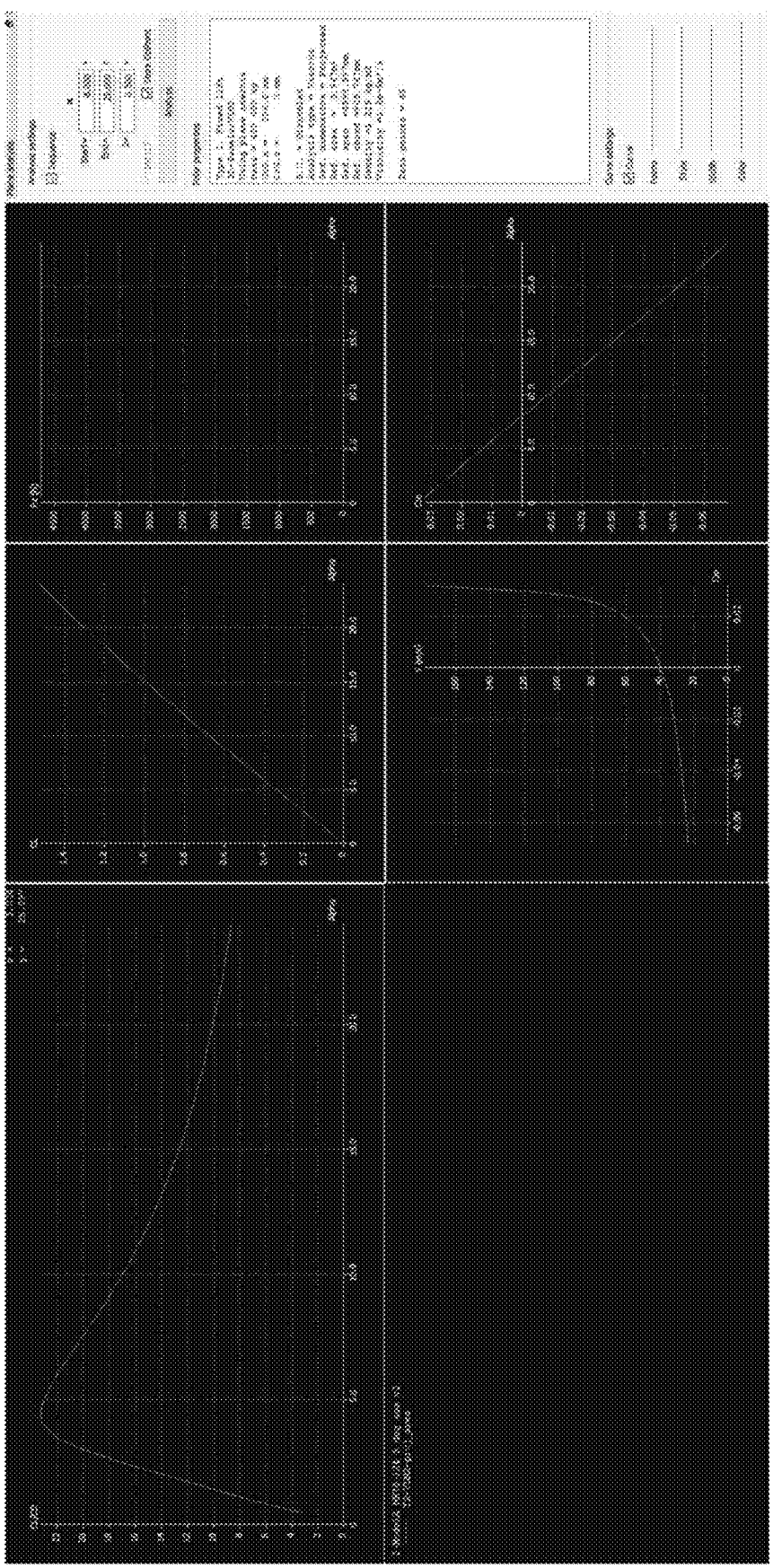
FIG. 14 is a set of graphs showing airfoil polars, in accordance with some embodiments.

FIG. 14 is a set of graphs showing airfoil polars, in accordance with some embodiments. The airfoil polars include the following specifications.

| Plane analysis Analysis settings: Sequence/Store OpPoint α | |
|---|---|
| Start | −8.000° |
| End | 25.000° |
| Δ | 0.500° |
| Polar properties | |
| Type 2: Fixed lift | |
| 3D-Panels/VLM2 | |
| Using plane inertia | |
| Mass | 480.00 kg |
| CoG.x | 206.6 mm |
| CoG.z | 0 mm |
| B.C. | Dirichlet |
| Analysis Type | Viscous |
| Ref. Dimensions | Projected |
| Ref. Area | 9.567 m$^2$ |
| Ref. Span | 4999.987 mm |
| Ref. Chord | 909.767 mm |
| Density | 1.225 kg/m3 |
| Viscosity | 1.5e−5 m$^2$/s |
| Data Points | 48 |

Figure 15:
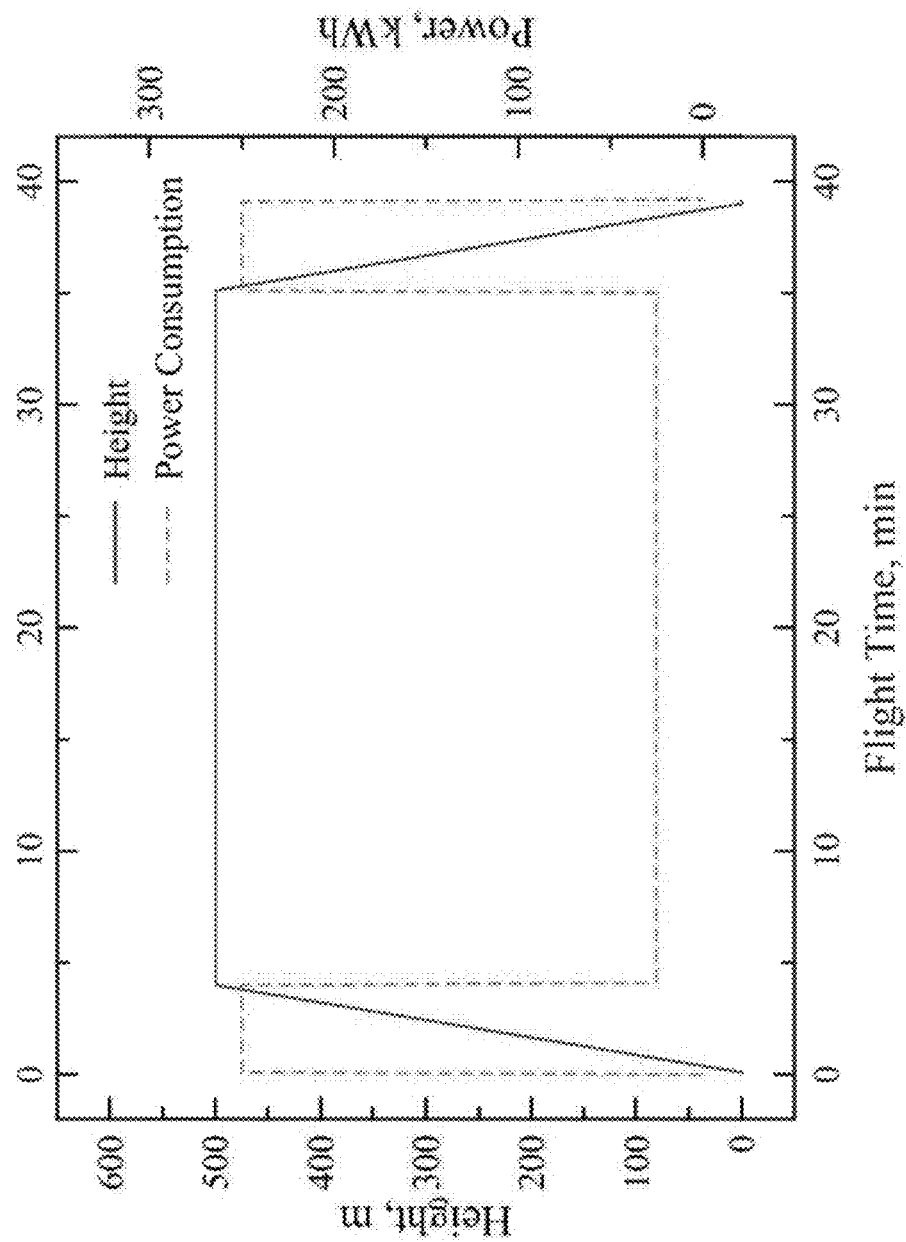
FIG. 15 is a graph showing a flight cyclogram in conjunction with height and energy consumption, in accordance with some embodiments.

FIG. 15 is a graph showing a flight cyclogram in conjunction with height and energy consumption, in accordance with some embodiments.

Figure 16:
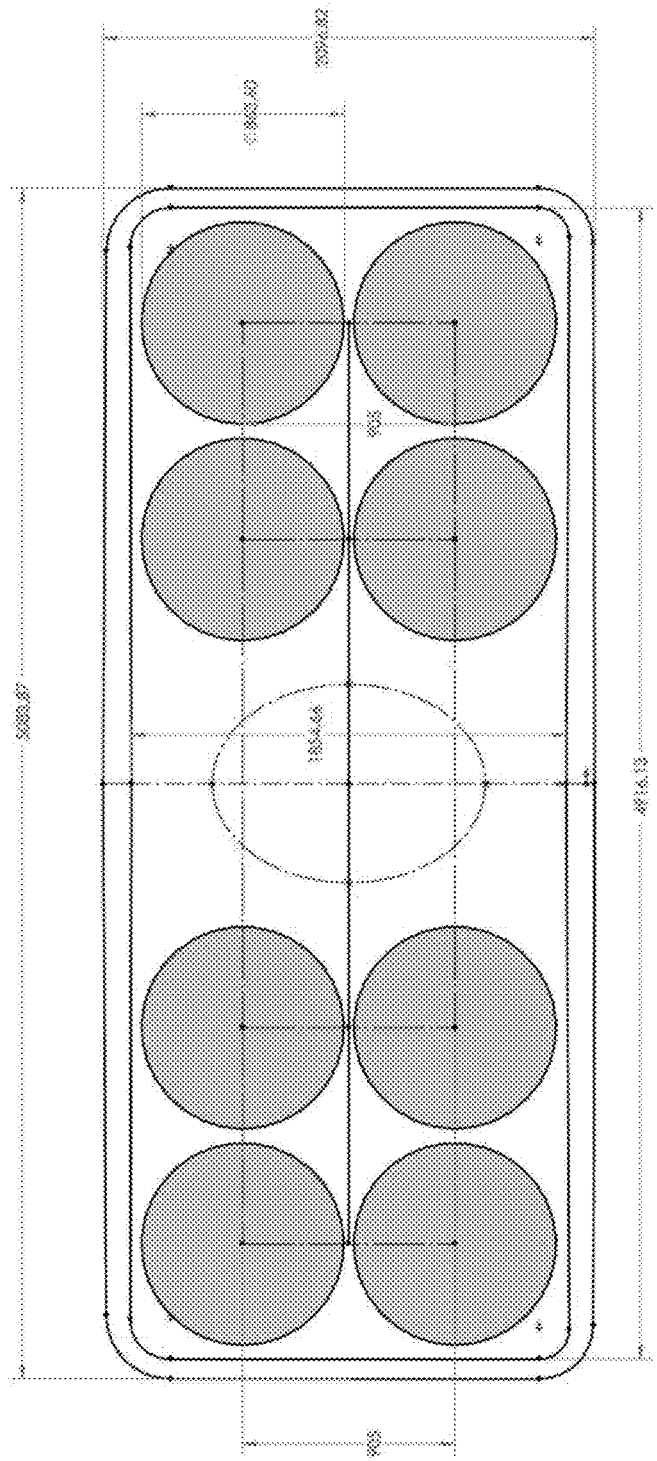
FIG. 16 is a diagram showing configuration details of a VTOL aircraft, in accordance with some embodiments.

FIG. 16 is a diagram showing configuration details of a VTOL aircraft, in accordance with some embodiments.

FIG. 17 is an exemplary exploded view showing modularity of the wing sections along with joints of wing frame to the support frame, in accordance with some embodiments.

In some embodiments, the VTOL aircraft 100 and 200 may be extended to an automobile functionality.

Table 1 below shows general characteristics of the VTOL aircraft 200, heavier, longer range version—Model A, in accordance with some embodiments. These parameters are merely examples, and can vary.

| Example characteristics | Value |
|---|---|
| Capacity: | One-two passenger |
| Length, m | 5.09 |
| Width, m | 2.12 |
| Height, m | 2.2 |
| Empty weight, kg | 400 |
| Nominal payload weight, kg | 80 |
| Nominal gross weight, kg | 480 |
| Maximum payload weight, kg | 120 |
| Cruise speed, m/s | 50.14 |
| Stall speed m/s | 0 |
| Never exceed speed m/s | 75.2 |

-continued

| Example characteristics | Value |
|---|---|
| Endurance in cruise, min | 57 |
| Range, km: | 171 |
| Service ceiling, km: | 0 |
| Rate of climb, m/s: | 4 |
| Transition time from vertical to horizontal flight mode, sec | 5-8 |
| Power plant: | 8 BLDC motors |
| Motors: | |
| Motor max burst power, kW | 110 |
| Motor max continuous power, kW | 32 |
| Max thrust to weight ratio | 3 |
| Battery capacity, kWh | 30 |
| Hover total power consumption, kW | 211 |
| Cruise total power consumption, kW | 26 |
| Battery: | |
| Total capacity, kWh | 30 |
| Number of Lithium-Polymer cells in the battery | 72 |
| No Load rated voltage, V | 274 |
| Max fully charged no load voltage, V | 295 |
| ESC (Electronic speed controller): | |
| Max voltage, V | 800 (for rated voltage 274 V) |
| Max burst current, A | 600 |
| Max output RMS voltage, V | 209 |
| Type of control | Field oriented control, sinusoidal waveform |
| Propellers: | 5-bladed, Carbon fiber, Variable pitch |
| Propeller diameter, m | 0.864 |
| Propeller pitch | Variable from 0 to infinity |
| Propeller pitch at hovering, inches | 14 |
| Number of rotors | 8 |
| Wing: | |
| Wing aspect ratio | 5 |
| Wing loading, kg/m² | 51 |
| Wing area, m² | 9.48 |
| Wing root chord length, m | 1 |
| Vertical stabilizer chord length, m | 0.71 |
| Lift to Drag ratio | 9.82 |
| Wing Reynolds number at cruise speed | 3529395 |
| Cruise wing angle of attack, degrees | 8 |

Table 2 below shows example weight characteristics of the VTOL aircraft 200, for the heavier, longer range Model A version, in accordance with some embodiments. These parameters are merely examples, and can vary.

| Component | Weight, kg |
|---|---|
| Wing | 37.8 |
| Tubes | 12 |
| Motors | 47.2 |
| Frame | 20 |
| Propellers | 2.4 |
| fasteners | 4 |
| Cabin | 35 |
| Cabin mechanism | 14 |
| Landing gears | 20 |
| Elevon mechanisms | 2 |
| Battery | 175 |
| ESC | 10.4 |
| Wires | 20 |
| Total Weight | 400 |

Table 3 below shows general characteristics of the VTOL aircraft 200, for a light, short range embodiment—Model Zero, in accordance with some embodiments. These parameters are merely examples, and can be different based on the use case and aircraft version.

| Example characteristics | Value |
|---|---|
| Capacity: | one passengers |
| Length, m | 5.09 |
| Width, m | 2.12 |
| Height, m | 2.2 |
| Empty weight, kg | 250 |
| Nominal payload weight, kg | 80 |
| Nominal gross weight, kg | 330 |
| Maximum payload weight, kg | 120 |
| Cruise speed, kg | 32.1 |
| Stall speed, kg | 0 |
| Never exceed speed, m/s | 64.2 |
| Endurance in cruise, min | 3.9 |
| Range, fixed pitch, km | 8 |
| Service ceiling, km | 3.7 |
| Max Rate of climb, m/s | 4 |
| Power plant: | 8 BLDC motors 45 kW each |
| Max thrust to weight ratio | 3 |
| Battery capacity, kWh | 11.4 |
| Hover power consumption, kW | 200 |
| Cruise power consumption Fixed pitch, kW | 50 |
| Cruise power consumption Variable pitch, FW optimized, kW | 18 |
| Propellers | 3-bladed, Carbon fiber, fixed pitch |
| Wing aspect ratio | 5 |
| Wing loading, kg/m² | 35 |
| Wing area, m² | 9.48 |
| Wing root chord length, m | 1 |
| Vertical stabilizer chord length, m | 0.71 |
| Lift to Drag ratio | 9.82 |
| Propeller diameter, m | 0.864 |
| Propeller pitch, m | 0.574 |
| Wing Reynolds number at cruise speed | 2259455 |

Table 4 below shows weight characteristics for the VTOL aircraft 200, for a light, short range version—Model Zero, in accordance with some embodiments. These parameters are merely examples and can be different based on the use case and aircraft version.

| Component | Weight, kg |
|---|---|
| Wing | 35 |
| Tubes | 12.12 |
| Motors | 47.2 |
| Frame | 20 |
| Propellers | 2.4 |
| fasteners | 3 |
| Simplified cabin | 30 |
| Cabin mechanism | 10 |
| Landing gears | 15 |
| Elevon mechanisms | 2 |
| Battery | 60 |
| ESC | 9.6 |
| Wires, battery close to motor placement | 4 |
| Total Weight | 250 |

Table 5 below shows two additional versions of the aircraft for one and two seater configurations for the VTOL aircraft 200 (Model A), in accordance with some embodiments. These parameters are merely examples, and can be different based on the use case and aircraft version.

| Example Parameter | Value (for one sitter) | Value (for two sitter) | Notes |
|---|---|---|---|
| Weight Parameters | | | |
| Person (s) / cargo | 100 kg | 200 kg | |
| Without person | 300 kg | 300 kg | |
| With person (s) | 400 kg | 500 kg | |
| Batteries weight | 190 kg | 190 kg | |
| Flight Parameters | | | |
| Vertical flight time | 1.2 min | 1.2 min | |
| Horizontal (forward) flight time | 58 min | 46 min | |
| Cruise Speed | 85 mph | 85 mph | |
| Flight Distance | 82 miles | 65 mph | derivative from flight time and cruise speed can be more but flight time in forward flight (FW) will be reduced |
| Flight Ceiling in MC mode | 320 m | 320 m | |
| Rate of climb in vertical flight | 4 m/s | 4 m/s | MC mode (multicopter mode) |
| PowerTrain Parameters | | | |
| Power (electrical) in vertical flight | 230 kW | 325 kW | |
| Power (electrical) in horizontal flight | 25.5 kW | 32.5 kWh | |
| Batteries capacity | 32.5 kWh | 32.5 kWh | |
| Aerodynamic parameters | | | |
| Wing Area | 9.5 m2 | 9.5 m2 | |
| "Stall" speed | 52 mph | 55 mph | MC (multicopter mode) and FW (forward flight) blending before 55 mph |

Table 6 below shows parameters of two different version of the VTOL aircraft 200 (option 1 and option 2) with different KV of the motors, in accordance with some embodiments. These parameters are merely examples, and can be different based on the use case and aircraft version.

| Example Parameter | Option 1 (50 KV) | Option 2 (80 KV) | Derivative Value | |
|---|---|---|---|---|
| Weight Parameters | | | | |
| Person (s)/cargo | 70 kg | 70 kg | | |
| Without person | 300 kg | 300 kg | | |
| With person (s) | 370 kg | 370 kg | | |
| Batteries weight | n/a | n/a | | |
| Propellers | | | | |
| Diameter/Pitch | 34/14 | 34/14 | | |
| Tip speed, 100% Throttle | 0.91 M | 0.95 M | | |
| Tip speed, 80% Throttle | 0.73 M | 0.76 | | |
| Motor | | | | |
| KV | 50 | 80 | | |
| Power, KW | 25-30 | 25-30 | | |
| RPM, 100% Throttle | 6845 | 7100 | | |
| Voltage, V | 137 | 89 | | |
| Current, 100% Throttle | 164 | 279 | | |
| Flight params-Vertical | | | | |
| Thrust 100% Throttle, kg | 76 | 80 | 608 | kg |
| Thrust 70% Throttle, kg | 48 | 52 | 384 | kg |
| Vertical flight time | 4 min | 4 min | | |
| Flight params-Horizontal | | | | |
| Horizontal (forward) flight time | 15 min | 15 min | | |
| Cruise Speed | 80 mph | 80 mph | | |
| Flight Distance | | | | |
| PowerTrain Parameters | | | | |
| Power (electrical) in vertical flight, 80% Throttle motor | 17 kW | 17.6 kW | | |
| Power (electrical) in vertical flight, 100% Throttle, motor | 25 kW | 26 kW | | |
| Power (electrical) in vertical flight | 178 kW | 186 kW | | |
| Power (electrical) in horizontal flight | 67 kW | 67 kW | | |
| Batteries capacity | | | | |

Table 7 below shows additional characteristics of the VTOL aircraft 200, in vertical flight, in accordance with some embodiments. Different empty weights are shown as some versions of the aircraft may have different empty weights and maximum payloads. These parameters are merely examples, and can vary.

| Example characteristics | 3 | Model A | 2 | 1 | Model Zero |
|---|---|---|---|---|---|
| Aircraft empty weight (with batteries), kg | 450 | 400 | 350 | 300 | 250 |
| Propeller FOM (figure of merit), % (TBD) | 55.8 | 55.8 | 55.8 | 55.8 | 55.8 |
| Passenger weight, kg | 80 | 80 | 80 | 80 | 80 |
| All-up weight, kg | 530 | 480 | 430 | 380 | 330 |
| Propeller diameter, mm | 863.6 | 863.6 | 863.6 | 863.6 | 863.6 |
| Total Propeller area, A, m² | 4.69 | 4.69 | 4.69 | 4.69 | 4.69 |
| Disc Loading $L_d$, kg/m² | 113.10 | 102.43 | 91.76 | 81.09 | 70.42 |
| Disc Loading $L_d$ lbs/sq. ft | 23.17 | 20.98 | 18.79 | 16.61 | 14.42 |
| Load Capacity $C_l$, g/W | 3.76 | 3.95 | 4.17 | 4.44 | 4.76 |
| Load Capacity $C_l$, lbs/kW | 8.29 | 8.71 | 9.20 | 9.79 | 10.50 |
| Load Capacity on 4 motors, g/W | 2.66 | 2.79 | 2.95 | 3.14 | 3.37 |
| Inter-propeller/frame/wing influence coefficient, $K_{pw}$ (TBD) | 1 | 1 | 1 | 1 | 1 |
| Total power in hover $P_h$, kW | 141.0 | 121.5 | 103.0 | 85.6 | 69.3 |
| Total power on 4 motor (outer or inner motors fail), kW | 234.6 | 202.2 | 171.4 | 142.4 | 115.3 |

-continued

| Example characteristics | 3 | Model A | 2 | 1 | Model Zero |
|---|---|---|---|---|---|
| Max motor power in 4-motors mode, in 70% hover, kW | 83.8 | 72.2 | 61.2 | 50.9 | 41.2 |
| Motor max power for 35% hover Pm35, kW | 50.4 | 43.4 | 36.8 | 30.6 | 24.7 |
| Motor max power for 40% hover Pm40, kW | 44.1 | 38.0 | 32.2 | 26.8 | 21.6 |
| Motor max power for 50% hover Pm50, kW | 35.3 | 30.4 | 25.8 | 21.4 | 17.3 |
| Battery Voltage (24 s), V | 96 | 96 | 96 | 96 | 96 |
| Motor/ESC max current in 4-motors mode, in 70% hover, A | 873 | 752 | 638 | 530 | 429 |
| Motor/ESC max current for 35% hover $I_{m35}$, A | 525 | 452 | 383 | 318 | 258 |
| Motor/ESC max current for 40% hover $I_{m40}$, A | 459 | 396 | 335 | 279 | 226 |
| Motor/ESC max current for 50% hover $I_{m50}$, A | 367 | 316 | 268 | 223 | 180 |
| Rotors hover thrust to maximum thrust in max fail condition, % | 70 | 70 | 70 | 70 | 70 |
| Motor/ESC nominal current for 35% hover, A | 367 | 316 | 268 | 223 | 180 |
| Motor/ESC nominal current for 40% hover, A | 321 | 277 | 235 | 195 | 158 |
| Motor/ESC nominal current for 50% hover, A | 257 | 222 | 188 | 156 | 126 |

Table 8 below shows the power lines characteristics estimations of the VTOL aircraft 200 in case of a central battery placement for 35% hover case with 4 inner motors fail, in accordance with some embodiments. The estimations are given for various wire sizes. These parameters are merely examples, and can be different based on the use case and aircraft version.

| Conductor AWG size chosen | 0000 (4/0) | 000 (3/0) | 00 (2/0) | 0 (1/0) | 1 | 2 | 3 | 4 | 5 | 6 |
|---|---|---|---|---|---|---|---|---|---|---|
| Conductor area, mm² | 107 | 85 | 67.4 | 53.5 | 42.4 | 33.6 | 26.7 | 21.2 | 16.8 | 13.3 |
| Conductor approximate working temperature, no motors fail, C.° | 35 | 40 | 45.0 | 50.0 | 60.0 | 70.0 | 82.5 | 97.5 | 121.3 | 145.0 |
| Conductor approximate working temperature, 4 motors fail, C.° | 136 | 167 | 191 | 210 | | | | | | |
| Conductor resistance mOhm/m | 0.161 | 0.203 | 0.2557 | 0.3224 | 0.4066 | 0.513 | 0.6465 | 0.815 | 1.028 | 1.296 |
| Resistance increase at working temperature relative to 20 deg, % | 5.90 | 7.86 | 9.83 | 11.79 | 15.72 | 19.65 | 24.56 | 30.46 | 39.79 | 49.13 |
| Total inner motors wire length for the central battery scheme, m | | | | | 20 | | | | | |
| Total outer motors wire length for the central battery scheme, m | | | | | 28 | | | | | |
| Resistance at working temperature, mOhm/m | 0.170 | 0.219 | 0.281 | 0.360 | 0.471 | 0.613 | 0.805 | 1.063 | 1.437 | 1.933 |
| Total power dissipation at working temperature, W | 107 | 138 | 177 | 227 | 296 | 386 | 507 | 670 | 905 | 1218 |
| Wire power loss, % | 0.19 | 0.24 | 0.31 | 0.39 | 0.51 | 0.67 | 0.88 | 1.16 | 1.57 | 2.11 |
| Wire weight per meter, without insulation, kg | 0.959 | 0.762 | 0.604 | 0.479 | 0.380 | 0.301 | 0.239 | 0.190 | 0.151 | 0.119 |
| Wire weight per meter, with insulation, kg/km | 1,135.1 | 911.1 | 741.91 | 597.98 | 494.11 | 372.44 | | 249.3 | | 214.29 |

-continued

| Conductor AWG size chosen | 0000 (4/0) | 000 (3/0) | 00 (2/0) | 0 (1/0) | 1 | 2 | 3 | 4 | 5 | 6 |
|---|---|---|---|---|---|---|---|---|---|---|
| Total wire weight, without insulation, kg | 46.0 | 36.6 | 23.0 | 23.0 | 18.2 | 14.5 | 11.5 | 9.1 | 7.2 | 5.7 |
| Total wire weight, with insulation, kg | 54.5 | 43.7 | 35.6 | 28.7 | 23.7 | 17.9 | | 12.0 | | 10.3 |

Table 9 below shows the dependence of the aircraft cruise speed to its all up weight. The predictions are done by using VLM (Vortex Lattice Method) calculation analysis. Different aircraft versions may have different weights, some of the version names are shown in the last column. These parameters are merely examples, and can vary.

| Vehicle empty weight, kg | All-up weight, kg | Angle of attack, degrees | Cruise speed, m/s | Cruise speed, mph | Version name |
|---|---|---|---|---|---|
| 400 | 480 | 8 | 38.75 | 86.67 | Model A |
| 300 | 380 | 8 | 34.5 | 77.17 | |
| 250 | 330 | 8 | 32.08 | 71.76 | Model Zero |
| 200 | 280 | 8 | 29.55 | 66.10 | |
| 150 | 230 | 8 | 26.79 | 59.93 | |

-continued

| Vehicle empty weight, kg | All-up weight, kg | Angle of attack, degrees | Cruise speed, m/s | Cruise speed, mph | Version name |
|---|---|---|---|---|---|
| 125 | 205 | 8 | 25.33 | 56.66 | Ultralight version |

Table 10 below shows optimal values for propeller pitch and motor KV for a particular flight mode of the VTOL aircraft 200, in accordance with some embodiments. These parameters are merely examples, and can be different based on the use case and aircraft version.

| Description | Air Speed | Propeller Pitch, inches | Motor KV | Motor power, KW |
|---|---|---|---|---|
| Motor KV optimal for MC for 34 × 14 prop and 45 KW motor | | 14 | 104.9 | 45 |
| Propeller pitch optimal for MC for 34 inch prop, 80 KV | | 22.664 | 80.0 | 45 |
| Propeller pitch optimal for FW for 34 inch prop, 80 KV | 71 mph | 34.7702 | 80.0 | 45 |

Table 11 below shows propeller and motor characteristics of the VTOL aircraft 200, in accordance with some embodiments. These parameters are merely examples, and can vary.

| Propeller configuration: blades, Diameter (inches) × Pitch (inches) | Motor KV (speed to voltage ratio), rpm/V | Propeller maximum rotational speed, rpm | Propeller rotational speed at Mach number 1, rpm | Mach number at propeller tip | Aircraft all-up-weight, kg | Battery Lithium Polymer cells | Motor maximum power, kW | Aircraft version name |
|---|---|---|---|---|---|---|---|---|
| 3 bladed 34 × 22.6 | 77 | 6697 | 7585 | 0.88 | 330 | 28 | 50 | Model Zero |
| 2 bladed 36 × 24 | 76 | 6685 | 7164 | 0.93 | 330 | 28 | 50 | Model Zero |
| 2 bladed 34 × 22.6 | 85 | 7424 | 7585 | 0.98 | 330 | 28 | 50 | Model Zero |
| 2 bladed 35 × 23.3 | 80 | 7424 | 7369 | 1.01 | 330 | 28 | 50 | Model Zero |
| 2 bladed 32 × 22 | 96 | 8240 | 8060 | 1.02 | 330 | 28 | 50 | Model Zero |
| 3 bladed 34 × 22.6 | 90 | 6515 | 7585 | 0.86 | 330 | 24 | 50 | Model Zero |
| 2 bladed 32 × 22 | 113 | 8052 | 8060 | 1.00 | 330 | 24 | 50 | Model A |
| 5 bladed, 34 × 22.6 | 31 | 7454 | 7585 | 0 98 | 480 | 72 | 50 | Model A |
| 2 bladed 34 × 22.6 | 73 | 6743 | 7585 | 0.89 | 330 | 24 | 35 | Model Zero |
| 3 bladed 34 × 22.6 | 63 | 5896 | 7585 | 0 78 | 330 | 24 | 35 | Model Zero |

Table 12 below shows weight estimations and other characteristics of the two versions of internal structure of the wing of the VTOL aircraft 200, in accordance with some embodiments. These parameters are merely examples, and can be different based on the use case and aircraft version.

| Parameter | Solid foam core version | Honeycomb sandwich version |
|---|---|---|
| Wing surface area, m$^2$ | 25.2 | 25.2 |
| Wing volume, m$^3$ | 0.833 | 0.833 |
| Honeycomb, density, kg/m$^2$ | | 29.0 |

-continued

| Parameter | Solid foam core version | Honeycomb sandwich version |
|---|---|---|
| Honeycomb, thickness, mm | | 3.0 |
| Honeycomb weight, for the whole wing surface, kg | | 2.2 |
| Foam density, lbs per square foot | 1.0 | |
| Foam density, kg/m$^3$ | 16.0 | |
| Foam total weight, kg | 13.3 | |
| Honeycomb to foam weight advantage, kg | | 11.1 |
| Wing perimeter, m | 16.0 | 16.0 |
| Carbon fiber fabric layers | 3 | 3 |
| Total fiber length, m | 48.0 | 48.0 |
| Carbon Fiber weight, kg | 28.85 | 28.85 |
| Total wing weight, kg | 42.2 | 31.1 |

Table 13 below shows characteristics of the wing of the VTOL aircraft 200, predicted by a CFD (Computational fluid dynamics) simulation, in accordance with some embodiments. These parameters are merely examples, and can be different based on the use case and aircraft version.

| Angle of attack, degrees | Air speed, m/s | Lift, N | Drag, N | Pitching Moment, Nm | Lift to Drag ratio |
|---|---|---|---|---|---|
| 0.5 | 158.549 | 6173 | 1965.5 | −5071.36 | 3.1 |
| 1 | 103.313 | 4490.3 | 860.08 | −1477.45 | 5.2 |
| 2 | 70.458 | 4394.32 | 454.456 | 42.821 | 9.7 |
| 3 | 56.886 | 4074.02 | 330.302 | 326.084 | 12.3 |
| 4 | 49.008 | 4052.22 | 284.132 | 534.552 | 14.3 |
| 5 | 43.7112 | 3906.9 | 253.034 | 574.41 | 15.4 |
| 6 | 39.843 | 3953.72 | 252.06 | 678.452 | 15.7 |
| 7 | 36.861 | 3894.06 | 258.152 | 714.108 | 15.1 |
| 8 | 34.372 | 3831.42 | 264.586 | 712.576 | 14.5 |
| 9 | 32.508 | 3923.56 | 285.13 | 782.608 | 13.8 |
| 10 | 30.856 | 3908.36 | 298.592 | 808.152 | 13.1 |
| 11 | 29.443 | 3871.16 | 314.532 | 803.878 | 12.3 |
| 12 | 28.218 | 3804.08 | 333.952 | 809.858 | 11.4 |
| 13 | 27.145 | 4097.16 | 374.86 | 892.964 | 10.9 |
| 14 | 26.195 | 3513.26 | 359.836 | 808.848 | 9.8 |
| 15 | 25.347 | 3464.96 | 394.576 | 881.108 | 8.8 |
| 16 | 24.585 | 3250.42 | 448.388 | 775.114 | 7.2 |
| 17 | 23.897 | 2808.38 | 532.706 | 925.056 | 5.3 |
| 18 | 23.272 | 2852.92 | 561.34 | 884.302 | 5.1 |
| 19 | 22.702 | 2558.48 | 566.57 | 828.994 | 4.5 |
| 20 | 22.179 | 2589 | 610.916 | 911.258 | 4.2 |
| 24 | 20.468 | 2055.46 | 663.384 | 732.602 | 3.1 |

The invention claimed is:

1. A vertical take-off and landing (VTOL) aircraft, comprising:
a rectangular wing including an upper wing section having a right upper wing side and a left upper wing side, a lower wing section having a right lower wing side and a left lower wing side, a right vertical wing section coupled to the right upper wing side and to the right lower wing side, and a left vertical wing section coupled to the left upper wing side and to the left lower wing side, the upper wing section having an upper wing cross section with a first asymmetrical airfoil shape configured to cause lift when in forward flight, the lower wing section having a lower wing cross section with a second asymmetrical airfoil shape for causing lift when in forward flight, each of the right vertical wing section and the left vertical wing section having a vertical wing cross section with a symmetrical shape to cause lateral stability when in forward flight;
two elevons on at least one of the upper wing section and the lower wing section;
at least one rudder on each of the right vertical wing section and the left vertical wing section;
a support frame coupled to the rectangular wing, wherein the support frame forms a rigid chassis, and wherein the support frame includes cross members which extend substantially from each corner or end of the rectangular wing to a diagonally opposed corner or end of the rectangular wing, thereby forming an "X" shape; and
a propulsion system coupled to the support frame to provide propulsion for the VTOL aircraft.

2. The VTOL aircraft of claim 1, wherein the first and second asymmetrical airfoil shapes have a camber line that curves back up near a trailing edge to add a positive pitching moment and to create positive longitudinal stability when in forward flight.

3. The VTOL aircraft of claim 1, wherein the lower wing section has a lower angle of attack than the upper wing section.

4. The VTOL aircraft of claim 1, wherein the lower wing section is arranged to shift a center of pressure of the VTOL aircraft to the upper wing section.

5. The VTOL aircraft of claim 1, wherein the lower wing section is arranged so that a center of gravity of the VTOL aircraft is located between a leading edge of the lower wing section and an aerodynamic center of the VTOL aircraft to provide longitudinal stability to the VTOL aircraft.

6. The VTOL aircraft of claim 1, wherein the upper wing section comprises a plurality of independent sections along a lateral axis sharing a plurality of longerons.

7. The VTOL aircraft of claim 6, wherein the lower wing section comprises a plurality of independent sections along a lateral axis sharing a plurality of longerons.

8. The VTOL aircraft of claim 1, wherein the propulsion system includes a plurality of electric propellers arranged between the upper and lower wing sections.

9. The VTOL aircraft of claim 1, wherein the right vertical wing section and the left vertical wing section are symmetrical airfoils to provide stabilization of a roll moment.

10. The VTOL aircraft of claim 1, wherein each of the upper wing section and the lower wing section is connectable to a vertical wing section by a corner section, each corner section being arranged to transition between lift forces of the upper or lower wing section and a lateral stabilizing force of the vertical wing section.

11. The VTOL aircraft of claim 10, wherein a portion of each corner section transitions from the airfoil shape of the upper wing section or lower wing section connectable thereto to a tapered wing tip, the corner section thereafter transitioning from the tapered wing tip to a symmetrical cross section of a connectable vertical wing section.

12. The VTOL aircraft of claim 11, wherein the transition of each corner section to the tapered wing tip starts at approximately 50% of a corner section perimeter edge that is parallel to the connectable upper wing section or lower wing section.

13. The VTOL aircraft of claim 12, wherein each corner section is arranged to shift a local aerodynamic center of the connectable upper wing section or lower wing section to the aft of the VTOL aircraft to improve longitudinal stability.

14. The VTOL aircraft of claim 1, wherein each of the upper wing section, the lower wing section, the right vertical wing section and the left vertical wing section include internal skeleton frames comprising ribs.

15. The VTOL aircraft of claim 14, wherein the upper wing section and the lower wing section include at least two longerons, the at least two longerons having a substantially round cross section.

16. The VTOL aircraft of claim 15, wherein the ribs are glued to the longerons.

17. The VTOL aircraft of claim 16, wherein the longerons and the ribs are made from carbon fiber tubes.

18. The VTOL aircraft of claim 14, wherein exterior surfaces of the upper wing section and the lower wing section comprise carbon fiber panels.

19. The VTOL aircraft of claim 18, wherein the carbon fiber panels are glued to the ribs.

20. The VTOL aircraft of claim 1, wherein each elevon has a frame, the frame comprising a plurality of longerons and ribs, and an outer surface of each elevon comprising one or more carbon fiber panels.

21. The VTOL aircraft of claim 20, wherein the one or more carbon fiber panels are glued to the ribs.

22. The VTOL aircraft of claim 1, wherein stabilizing members extend vertically between the cross members of the support frame, and wherein the support frame is comprised of one or more of aluminum and carbon-fiber tubing with aerodynamic profiles.

23. The VTOL aircraft of claim 22, wherein the propulsion system includes a plurality of electric propellers arranged between the upper and lower wing sections, and wherein the plurality of electric propellers are mounted to one or more of the support frame and the stabilizing members.

24. The VTOL aircraft of claim 1, further comprising wheels attached to the rectangular wing.

* * * * *